US011404073B1

(12) United States Patent
Zhang

(10) Patent No.: US 11,404,073 B1
(45) Date of Patent: Aug. 2, 2022

(54) METHODS FOR DETECTING DOUBLE-TALK

(71) Applicant: Amazon Technologies, Inc., Seattle, WA (US)

(72) Inventor: Xianxian Zhang, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 16/219,129

(22) Filed: Dec. 13, 2018

(51) Int. Cl.
*G10L 21/0208* (2013.01)
*G10L 21/0216* (2013.01)
*H04R 3/02* (2006.01)

(52) U.S. Cl.
CPC ............ *G10L 21/0216* (2013.01); *H04R 3/02* (2013.01); *G10L 2021/02082* (2013.01); *G10L 2021/02166* (2013.01)

(58) Field of Classification Search
CPC . G10L 21/0208; G10L 21/0216; G10L 21/02; G10L 21/0224; G10L 21/0316; G10L 21/034; G10L 21/0364; G10L 21/057; G10L 25/48; G10L 25/51; G10L 25/78; G10L 25/81; G10L 25/84

USPC .......................... 704/226, 210, 215, 216, 218
See application file for complete search history.

(56) References Cited

U.S. PATENT DOCUMENTS

2003/0039353 A1* 2/2003 Matsuo ................. H04M 9/082
379/406.01
2020/0145752 A1* 5/2020 Janse ..................... H04R 3/005

* cited by examiner

*Primary Examiner* — Qi Han
(74) *Attorney, Agent, or Firm* — Pierce Atwood LLP

(57) ABSTRACT

A system configured to improve double-talk detection. The system inputs microphone signals into an adaptive filter and determines whether double talk is present based on how the adaptive filter adapts to the microphone signals. For example, when an audible sound is detected, the adaptive filter updates the filter coefficients that correspond to a time difference of arrival of the audible sound. Thus, the device may detect single-talk conditions (e.g., a single peak in the filter coefficients) or double-talk conditions (e.g., two peaks in the filter coefficients). In addition, the device may track a location of the local speech or remote speech over time based on the time difference of arrival.

20 Claims, 20 Drawing Sheets

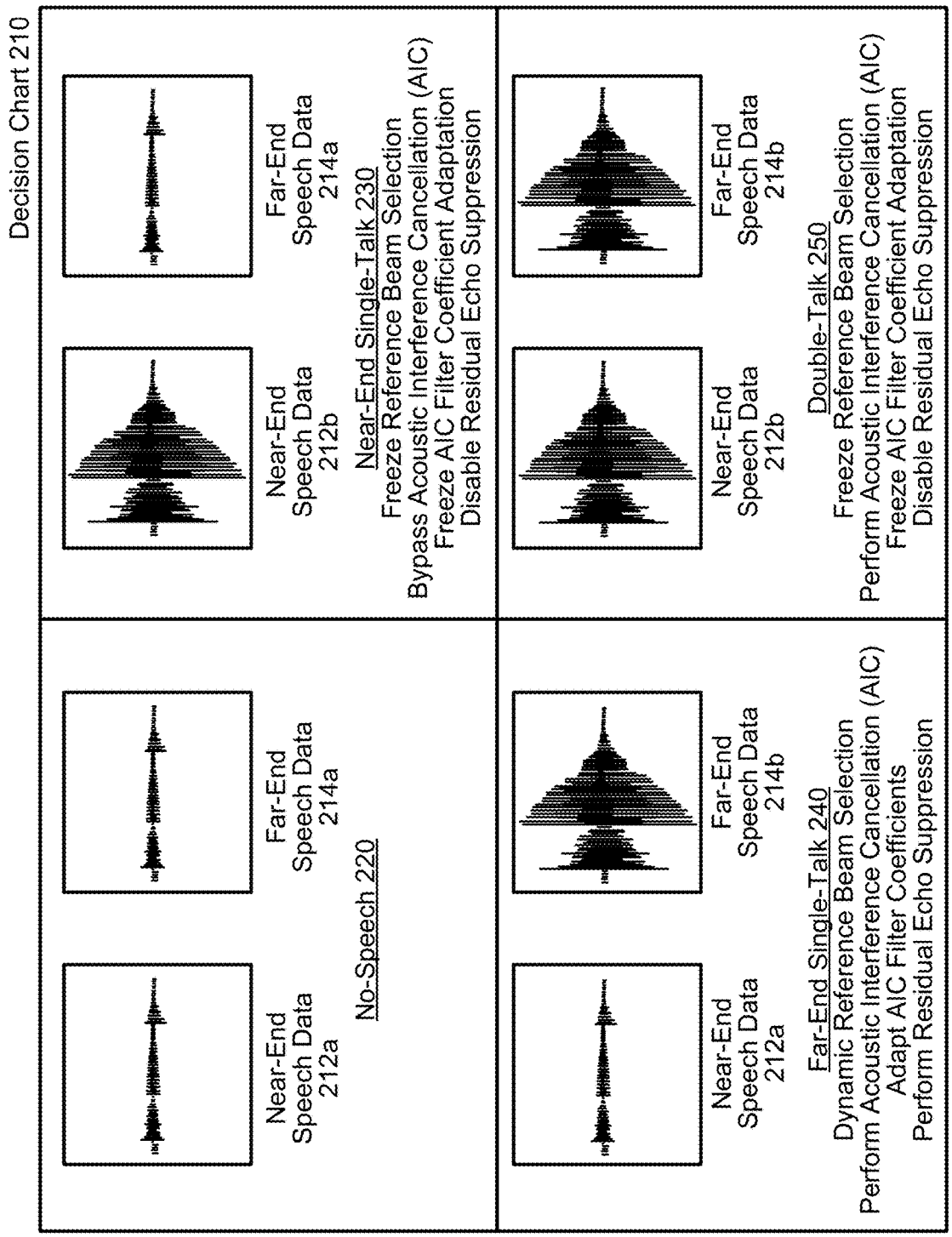

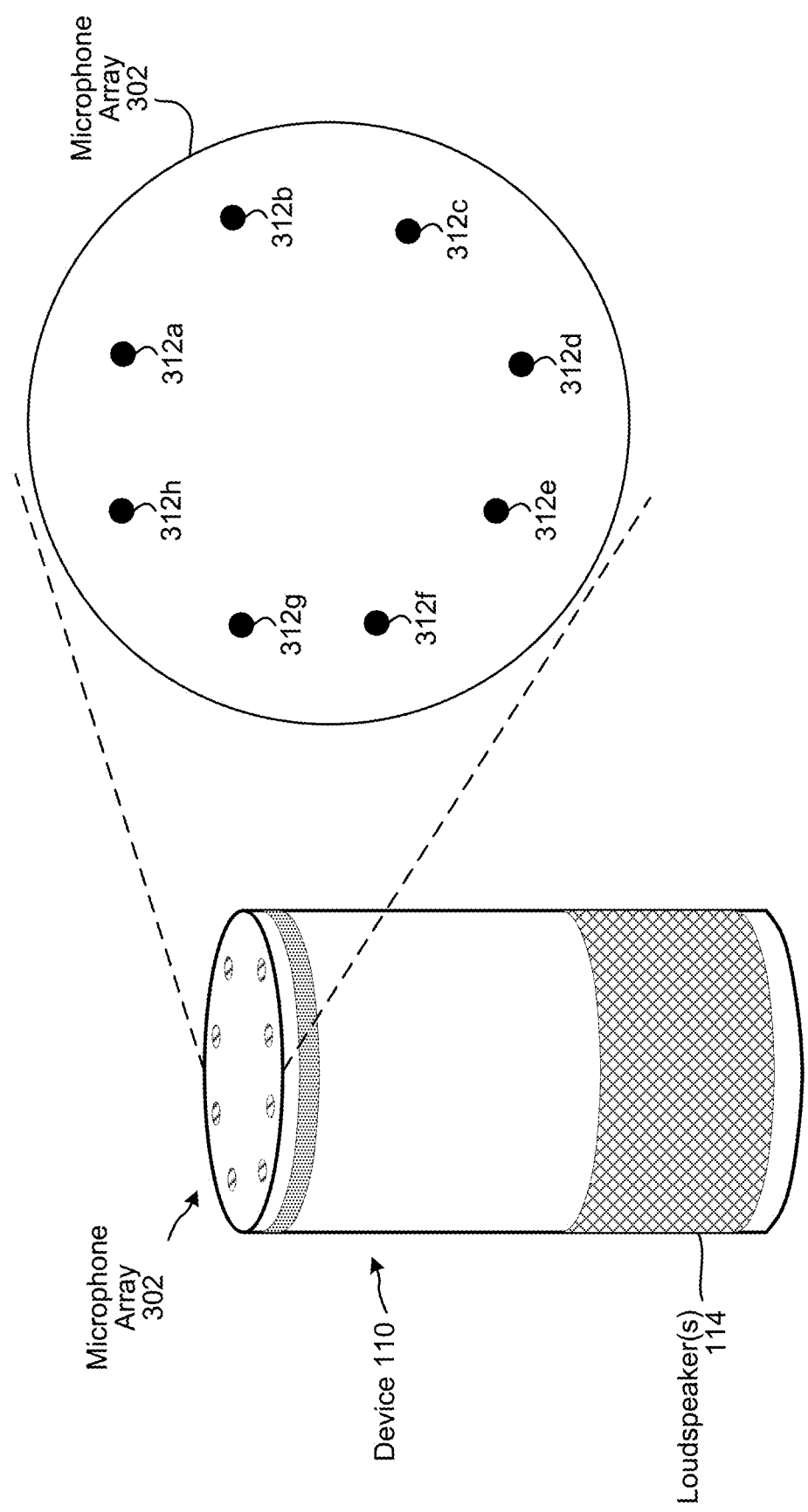

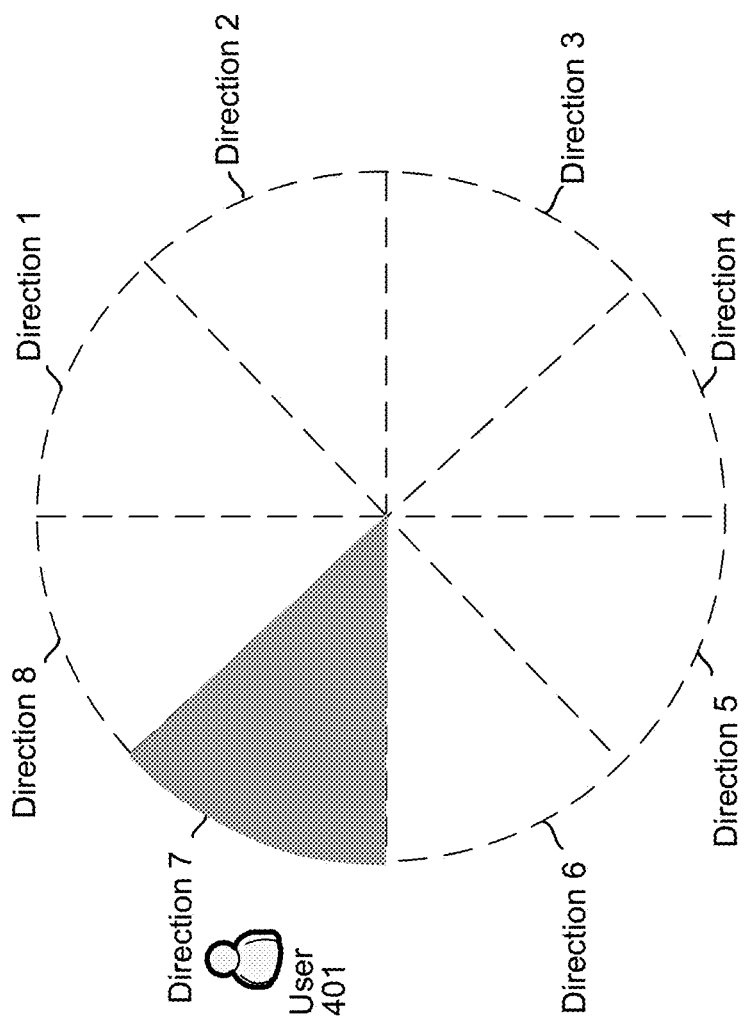

FIG. 5A  Dynamic Reference Beam Selection During Far-End Single-Talk
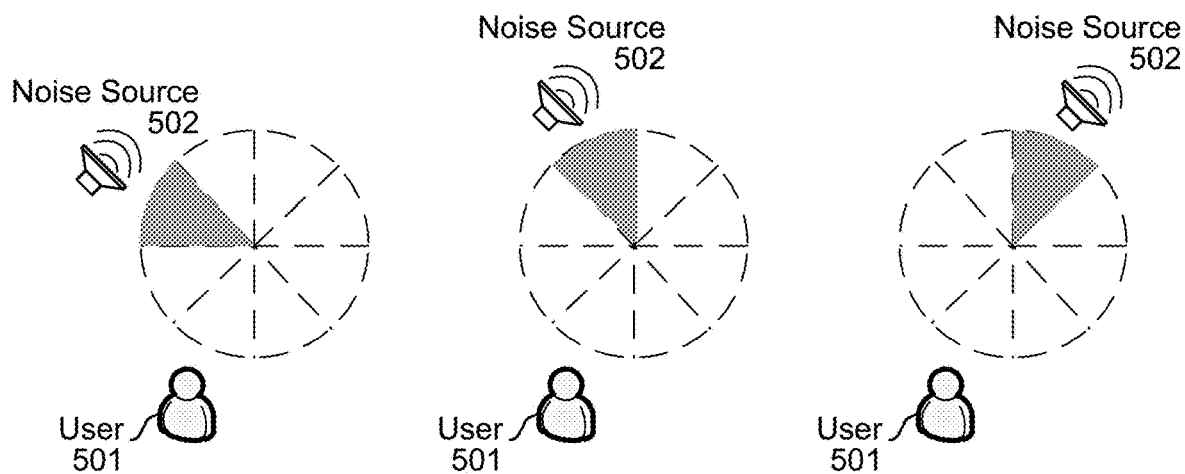
FIG. 5B  Dynamic Reference Beam Selection During Near-End Single-Talk
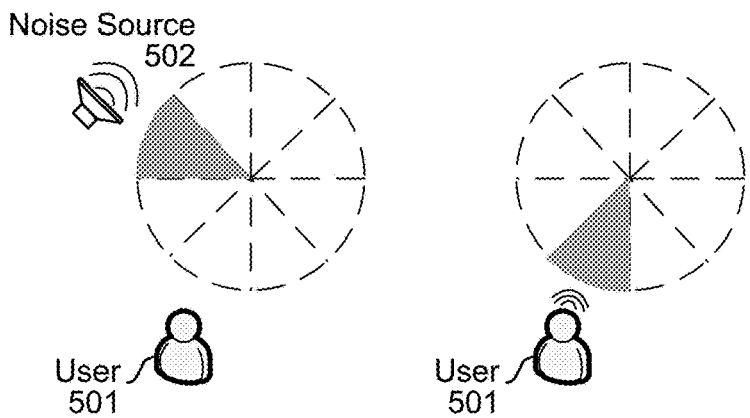
FIG. 5C  Freezing Reference Beam Selection During Near-End Single-Talk
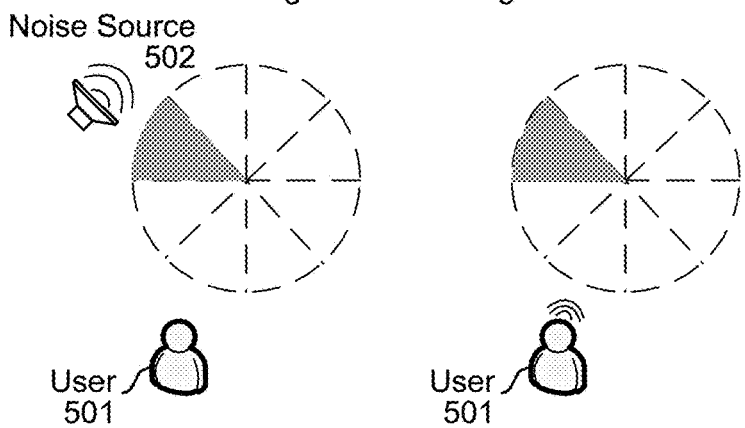

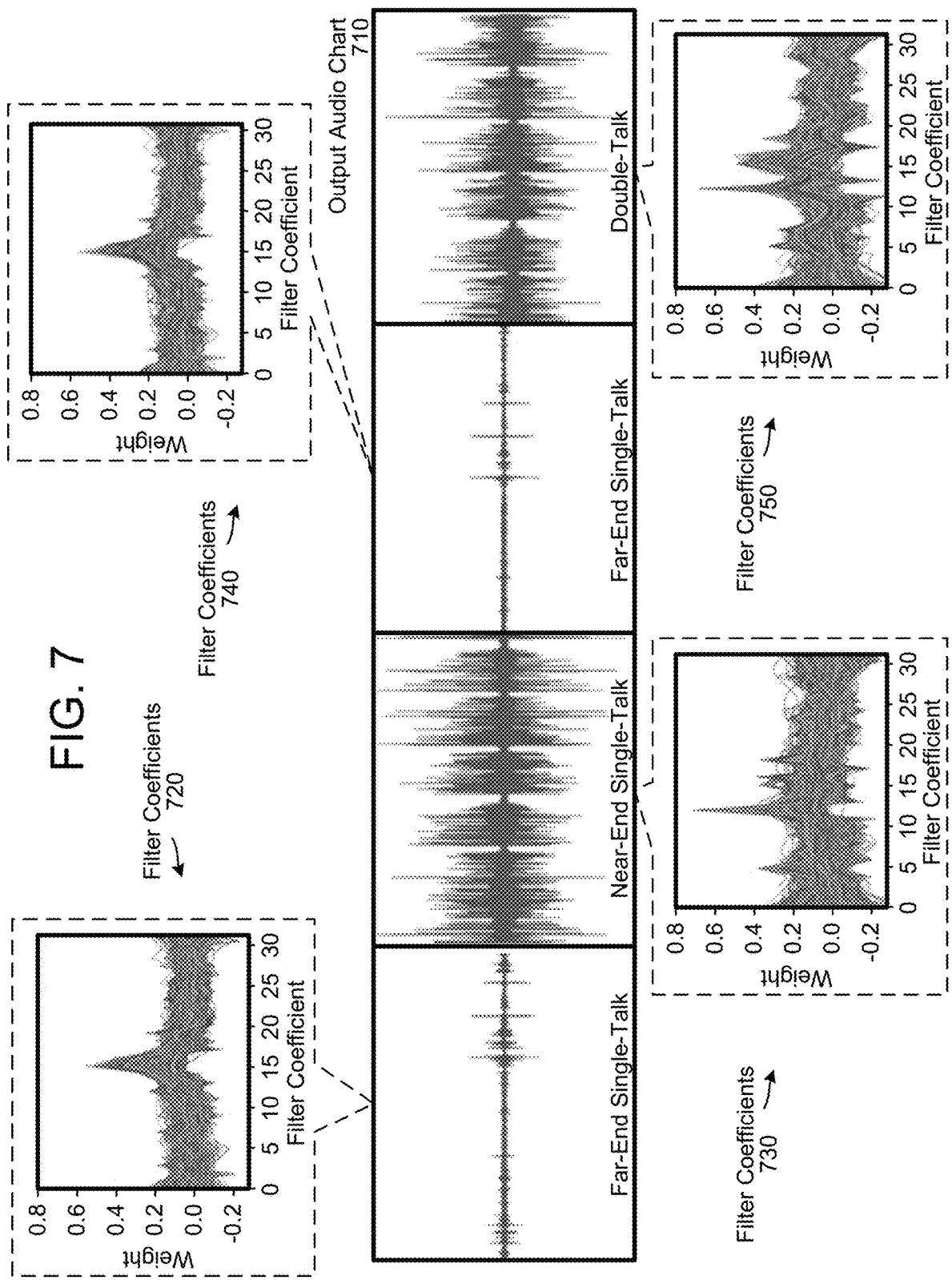

FIG. 9A

| Peaks | Decision |
|---|---|
| 0 | Silence |
| 1 | Single-Talk |
| 2 | Double-Talk |

Decision Chart
910

FIG. 9B

| Peaks | Decision | |
|---|---|---|
| | No Far-End Speech | Far-End Speech |
| 0 | Silence | Silence |
| 1 | Near-End Single-Talk | Far-End Single-Talk |
| 2 | Multiple Near-End Single-Talk | Double-Talk |

← Additional Context Data 922

Decision Chart
920

FIG. 11A
Far-End Single-Talk
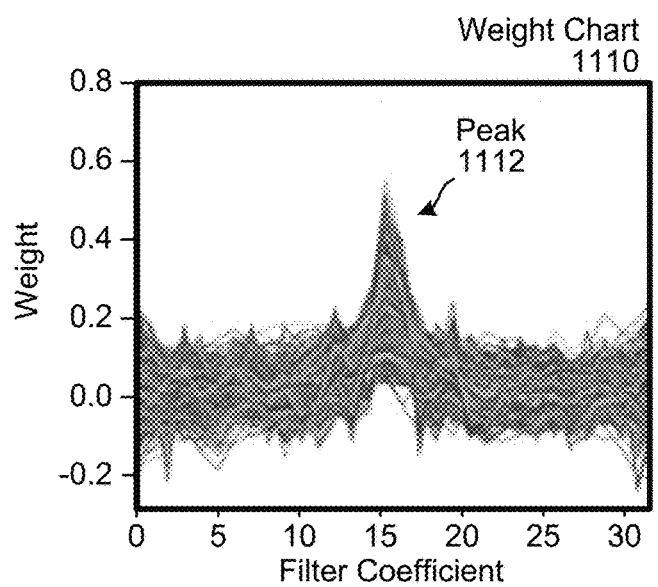
Near-End Single-Talk
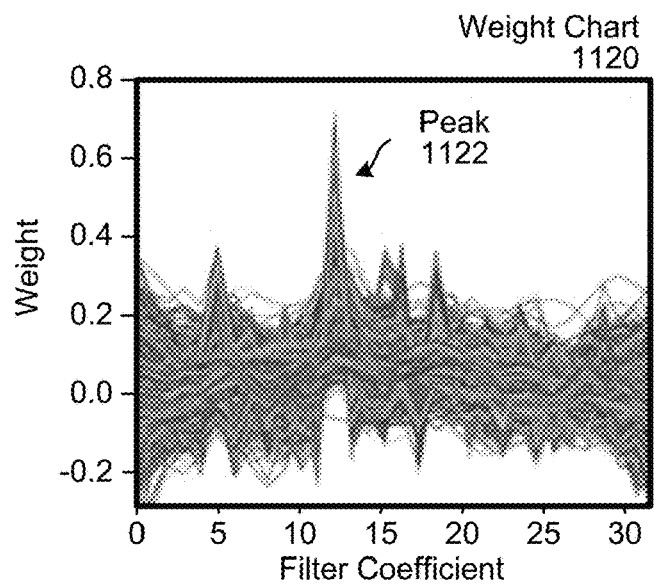
Double-Talk
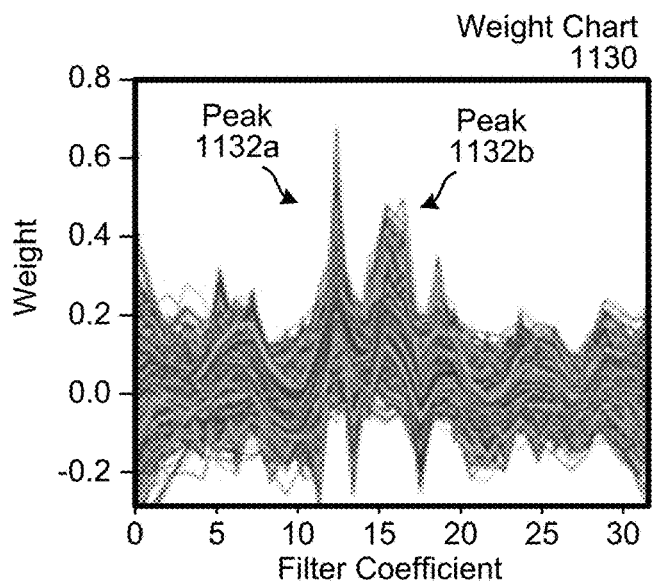

FIG. 11C
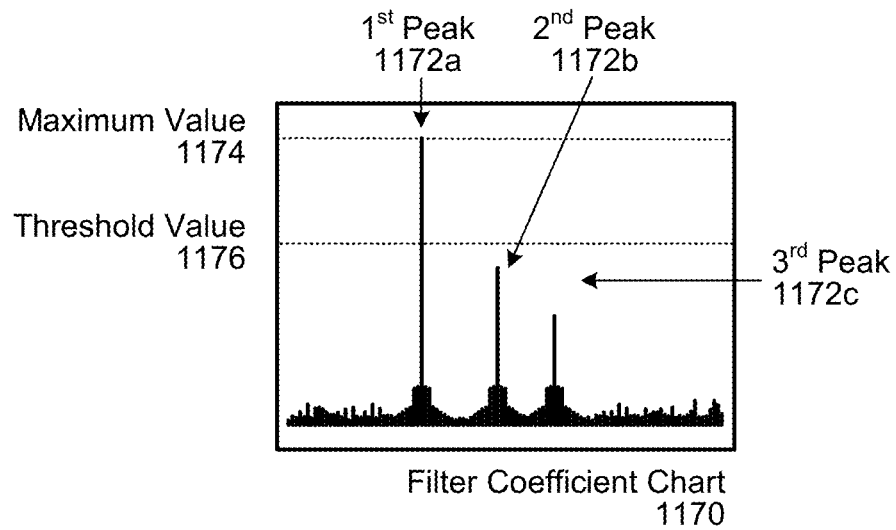
Filter Coefficient Chart
1170
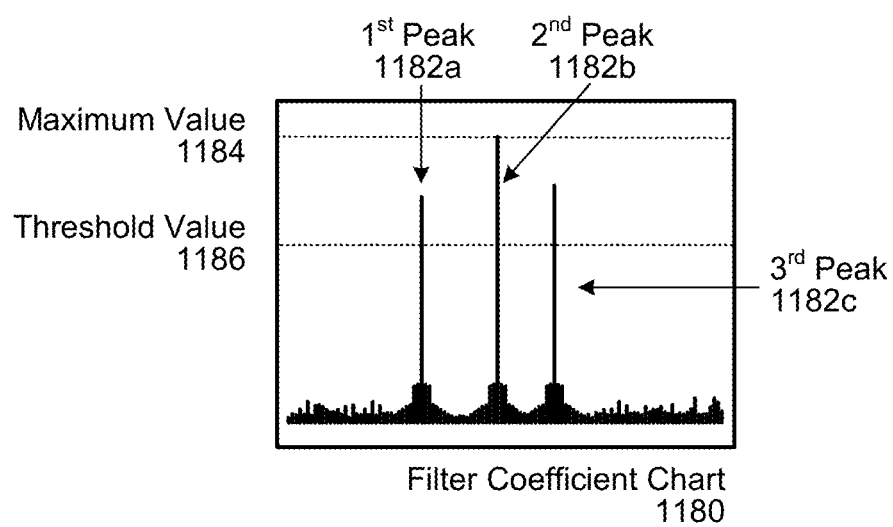
Filter Coefficient Chart
1180
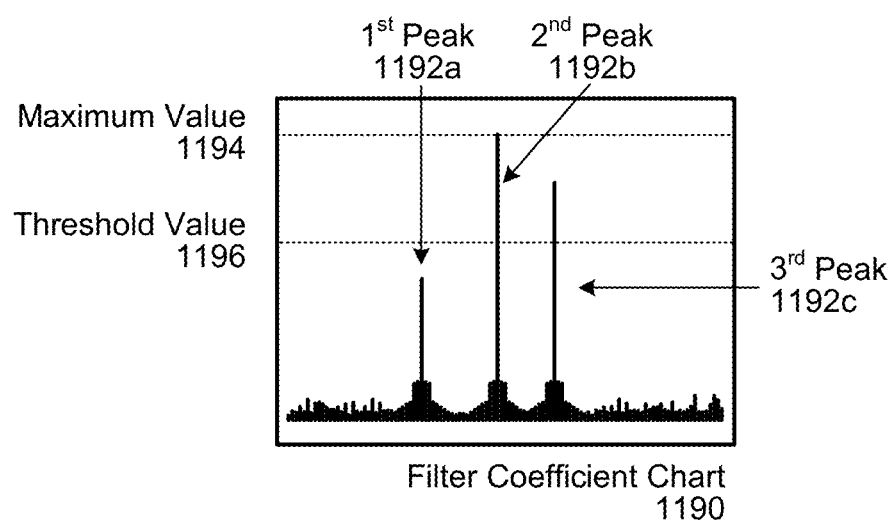
Filter Coefficient Chart
1190

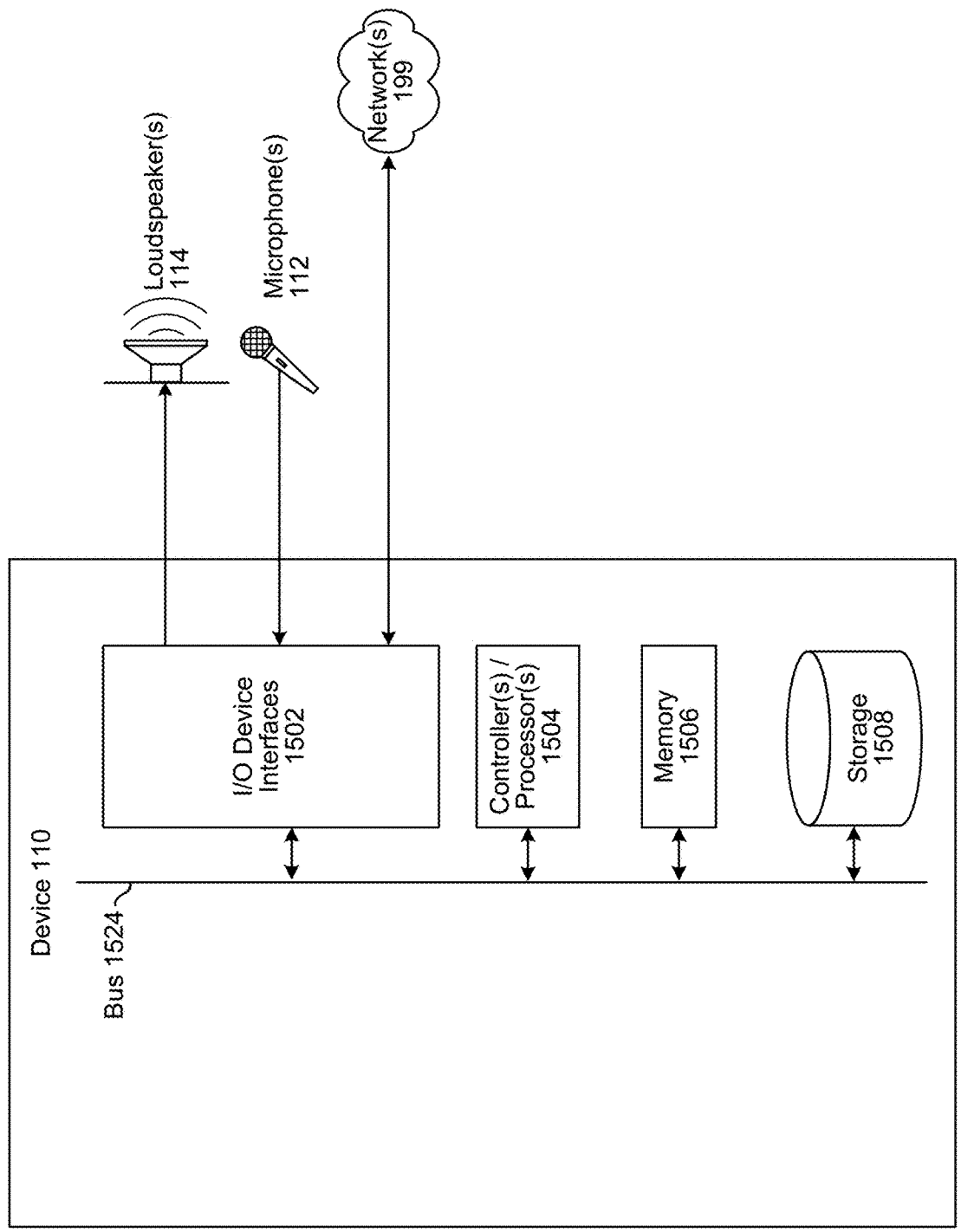

METHODS FOR DETECTING DOUBLE-TALK

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 2 illustrates an example decision chart for varying parameters based on system conditions according to examples of the present disclosure.

FIG. 3 illustrates a microphone array according to embodiments of the present disclosure.

FIGS. 4B and 4C illustrate isolating audio from a direction to focus on a desired audio source according to embodiments of the present disclosure.

FIGS. 5A-5C illustrate dynamic and fixed reference beam selection according to embodiments of the present disclosure.

FIG. 7 illustrates examples of determining system conditions according to examples of the present disclosure.

FIGS. 9A-9B illustrate examples of determining system conditions according to examples of the present disclosure.

FIGS. 11A-11C illustrate examples of performing double-talk detection using filter coefficients according to examples of the present disclosure.

FIG. 15 is a block diagram conceptually illustrating example components of a system according to embodiments of the present disclosure.

DETAILED DESCRIPTION

Electronic devices may be used to capture and process audio data. The audio data may be used for voice commands and/or may be output by loudspeakers as part of a communication session. During a communication session, loudspeakers may generate audio using playback audio data while a microphone generates local audio data. An electronic device may perform audio processing, such as acoustic echo cancellation, residual echo suppression, and/or the like, to remove an "echo" signal corresponding to the playback audio data from the local audio data, isolating local speech to be used for voice commands and/or the communication session.

The device may apply different settings for audio processing based on current system conditions (e.g., whether local speech and/or remote speech is present in the local audio data). For example, when remote speech is present and local speech is not present in the local audio data (e.g., "far-end single-talk"), the device may use aggressive audio processing to suppress the unwanted additional signals included in the local audio data. When local speech is present and remote speech is not present in the local audio data (e.g., "near-end single-talk"), the device may use light audio processing to pass any speech included in the local audio data without distortion or degrading the speech. However, when remote speech and local speech are both present in the local audio data (e.g., "double-talk"), aggressive audio processing suppresses and/or distorts the local speech while light audio processing passes unwanted additional signals.

The device may determine the current system conditions using double-talk detection. Typically, conventional double-talk detection techniques calculate a cross-correlation between the local audio data and the playback audio data and determine whether near-end single-talk conditions, far-end single-talk conditions, or double-talk conditions are present based on the cross-correlation. While these conventional double-talk detection techniques may accurately detect current system conditions, calculating the cross-correlation results in latency or delays. More importantly, when using wireless loudspeaker(s) and/or when there are variable delays in outputting the playback audio data, performing the cross-correlation may require an extremely long analysis window (e.g., up to and exceeding 700 ms), as the echo latency is hard to predict and may vary. This long analysis window for finding the peak of the correlation requires not only a large memory but also increases a processing requirement (e.g., computation cost) for performing double-talk detection.

Figure 1:
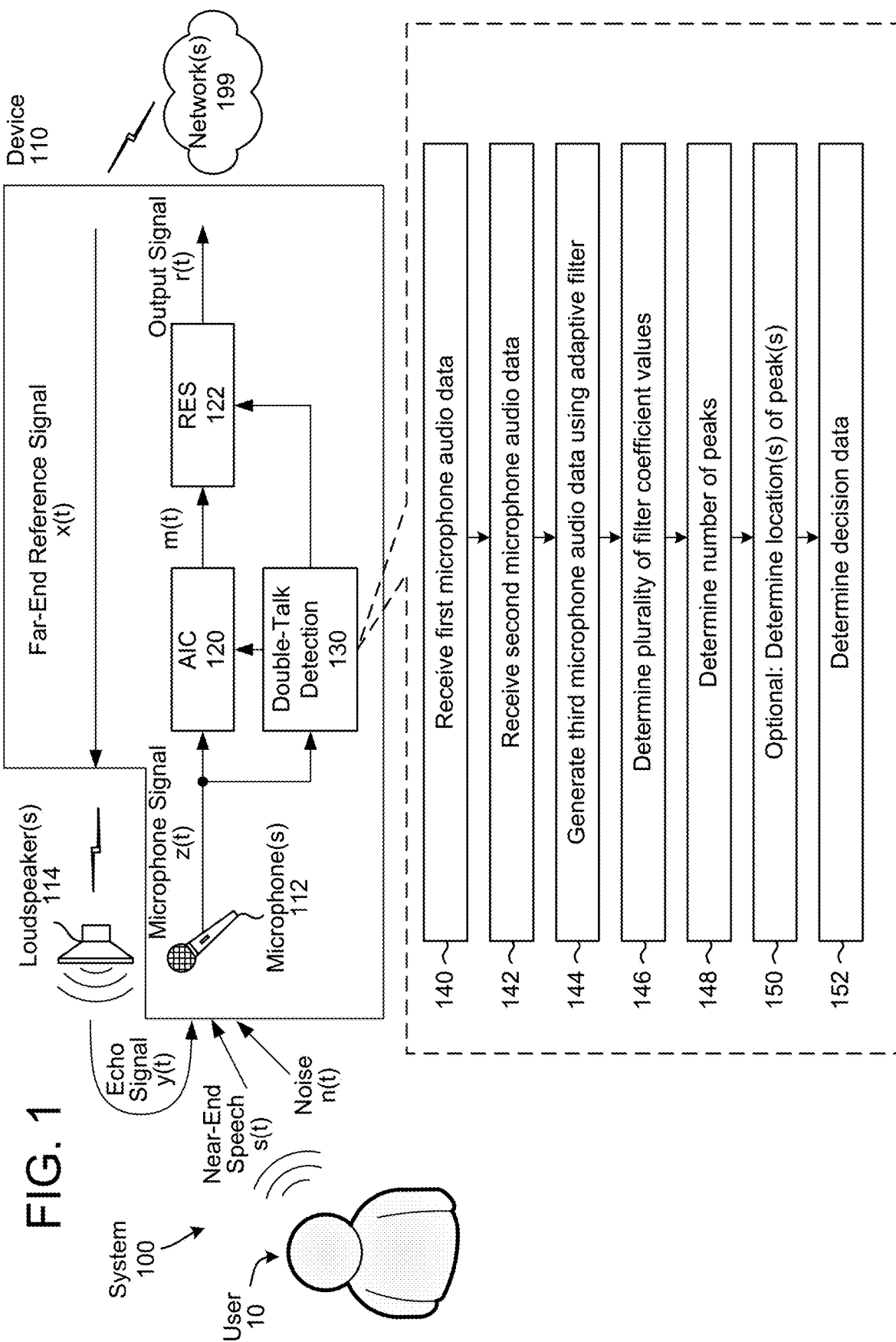
FIG. 1 illustrates a system according to embodiments of the present disclosure.

To improve double-talk detection, devices, systems and methods are disclosed that identify unique sources of audible noise using an adaptive filter. For example, a device may input microphone signals into an adaptive filter and adapt filter coefficient values of the adaptive filter whenever speech is detected in the microphone signals. Based on a number of peaks in the filter coefficient values and location(s) of the peaks, the device may identify unique sources of audible noise. For example, when an audible sound is detected, the adaptive filter updates the filter coefficients that correspond to a time difference of arrival of the audible sound. Thus, the device may detect single-talk conditions (e.g., a single peak in the filter coefficients) or double-talk conditions (e.g., two peaks in the filter coefficients). In addition, the device may track a location of the local speech or remote speech over time based on the time difference of arrival FIG. 1 illustrates a high-level conceptual block diagram of a system 100 configured to perform double-talk detection. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 that may be communicatively coupled to network(s) 199 and may include one or more microphone(s) 112 in a microphone array and/or one or more loudspeaker(s) 114. However, the disclosure is not limited thereto and the device 110 may include additional components without departing from the disclosure.

To emphasize that the double-talk detection is beneficial when variable delays are present, FIG. 1 illustrates the one or more loudspeaker(s) 114 as being external to the device 110 and connected to the device 110 wirelessly. However, the disclosure is not limited thereto and the loudspeaker(s) 114 may be included in the device 110 and/or connected via a wired connection without departing from the disclosure. For example, the loudspeaker(s) 114 may correspond to a wireless loudspeaker, a television, an audio system, and/or the like connected to the device 110 using a wireless and/or wired connection without departing from the disclosure.

In some examples, the loudspeaker(s) 114 may be internal to the device 110 without departing from the disclosure. Typically, generating output audio using only an internal loudspeaker corresponds to a fixed delay and therefore the device 110 may detect system conditions using other double-talk detection algorithms. However, when the loudspeaker is internal to the device 110, the device 110 may perform the techniques described herein in place of and/or in addition to the other double-talk detection algorithms to improve a result of the double-talk detection. For example, as will be described in greater detail below, the double-talk detection component 130 may be configured to determine location(s) associated with a target signal (e.g., near-end or local speech) and/or a reference signal (e.g., far-end or remote speech, music, and/or other audible noises output by the loudspeaker(s) 114). Therefore, while a location of the internal loudspeaker may be known, the device 110 may use the double-talk detection component 130 to determine location(s) associated with one or more near-end talkers (e.g., user 10).

The device 110 may be an electronic device configured to send audio data to and/or receive audio data. For example, the device 110 (e.g., local device) may receive playback audio data (e.g., far-end reference audio data) from a remote device and the playback audio data may include remote speech originating at the remote device. During a communication session, the device 110 may generate output audio corresponding to the playback audio data using the one or more loudspeaker(s) 114. While generating the output audio, the device 110 may capture microphone audio data (e.g., input audio data) using the one or more microphone(s) 112. In addition to capturing desired speech (e.g., the microphone audio data includes a representation of local speech from a user 10), the device 110 may capture a portion of the output audio generated by the loudspeaker(s) 114 (including a portion of the remote speech), which may be referred to as an "echo" or echo signal, along with additional acoustic noise (e.g., undesired speech, ambient acoustic noise in an environment around the device 110, etc.), as discussed in greater detail below.

The system 100 may operate differently based on whether local speech (e.g., near-end speech) and/or remote speech (e.g., far-end speech) is present in the microphone audio data. For example, when the local speech is detected in the microphone audio data, the device 110 may apply first parameters to improve an audio quality associated with the local speech, without attenuating or degrading the local speech. In contrast, when the local speech is not detected in the microphone audio data, the device 110 may apply second parameters to attenuate the echo signal and/or noise.

As will be discussed in greater detail below, the device 110 may include a double-talk detection component 130 that determines current system conditions. For example, the double-talk detection component 130 may determine that neither local speech nor remote speech are detected in the microphone audio data, which corresponds to no-speech conditions. In some examples, the double-talk detection component 130 may determine that local speech is detected but remote speech is not detected in the microphone audio data, which corresponds to near-end single-talk conditions (e.g., local speech only). Alternatively, the double-talk detection component 130 may determine that remote speech is detected but local speech is not detected in the microphone audio data, which corresponds to far-end single-talk conditions (e.g., remote speech only). Finally, the double-talk detection component 130 may determine that both local speech and remote speech is detected in the microphone audio data, which corresponds to double-talk conditions (e.g., local speech and remote speech).

Typically, conventional double-talk detection components knows whether the remote speech is present based on whether the remote speech is present in the playback audio data. When the remote speech is present in the playback audio data, the echo signal is often represented in the microphone audio data after a consistent echo latency. Thus, the conventional double-talk detection components may estimate the echo latency by taking a cross-correlation between the playback audio data and the microphone audio data, with peaks in the cross-correlation data corresponding to portions of the microphone audio data that include the echo signal (e.g., remote speech). Therefore, the conventional double-talk detection components may determine that remote speech is detected in the microphone audio data and distinguish between far-end single-talk conditions and double-talk conditions by determining whether the local speech is also present. While the conventional double-talk detection components may determine that local speech is present using many techniques known to one of skill in the art, in some examples the conventional double-talk detection components may compare peak value(s) from the cross-correlation data to threshold values to determine current system conditions. For example, low peak values may indicate near-end single-talk conditions (e.g., no remote speech present due to low correlation between the playback audio data and the microphone audio data), high peak values may indicate far-end single-talk conditions (e.g., no local speech present due to high correlation between the playback audio data and the microphone audio data), and middle peak values may indicate double-talk conditions (e.g., both local speech and remote speech present, resulting in medium correlation between the playback audio data and the microphone audio data).

While the conventional double-talk detection components may accurately detect current system conditions, calculating the cross-correlation results in latency or delays. More importantly, when using wireless loudspeaker(s) 114 and/or when there are variable delays in outputting the playback audio data, performing the cross-correlation may require an extremely long analysis window (e.g., up to and exceeding 700 ms) to detect the echo latency, which is hard to predict and may vary. This long analysis window for finding the peak of the correlation requires not only a large memory but also increases a processing requirement (e.g., computation cost) for performing double-talk detection.

The double-talk detection component 130 may receive a portion of the microphone signal z(t) corresponding to two microphones 112 and may generate decision data. For example, as will be described in greater detail below with regard to FIG. 7, the double-talk detection component 130 may include an adaptive filter that performs acoustic interference cancellation (AIC) processing using a first microphone signal as a target signal and a second microphone signal as a reference signal. To avoid confusion with the adaptive filter associated with the AIC component 120, the adaptive filter associated with the double-talk detection component 130 may be referred to as a least mean squares (LMS) adaptive filter, and corresponding filter coefficient values may be referred to as LMS filter coefficient data. Based on the LMS filter coefficient data of the LMS adaptive filter, the double-talk detection component 130 may determine if near-end single-talk conditions, far-end single-talk conditions, or double-talk conditions are present. For example, the double-talk detection component 130 may distinguish between single-talk conditions and double-talk conditions based on a number of peaks represented in the LMS filter coefficient data. Thus, a single peak corresponds to single-talk conditions, whereas two or more peaks may correspond to double-talk conditions.

In some examples, the double-talk detection component 130 may only update the LMS filter coefficients for the LMS adaptive filter when a meaningful signal is detected. For example, the device 110 will not update the LMS filter coefficients when speech is not detected in the microphone signal z(t). The device 110 may use various techniques to determine whether audio data includes speech, including performing voice activity detection (VAD) techniques using a VAD detector. When the VAD detector detects speech in the microphone audio data 602, the device 110 performs double-talk detection on the microphone audio data 602 and/or updates the LMS filter coefficients of the LMS adaptive filter.

In some examples, the device 110 may determine whether far-end speech is present in the microphone signal z(t). When far-end speech is not present, the double-talk detection component 130 may determine that near-end single-talk conditions are present. However, when the far-end speech is present in the microphone signal z(t), the double-talk detection component 130 may distinguish between far-end single-talk conditions (e.g., a single peak represented in the LMS filter coefficient data) and double-talk conditions (e.g., two or more peaks represented in the LMS filter coefficient data) based on the LMS filter coefficient data.

The double-talk detection component 130 may generate decision data that indicates current system conditions (e.g., near-end single-talk conditions, far-end single-talk conditions, or double-talk conditions). In some examples, the decision data may include location data indicating a location (e.g., direction relative to the device 110) associated with each of the peaks represented in the LMS filter coefficient data. For example, individual filter coefficients of the LMS adaptive filter may correspond to a time difference of arrival of the audible sound (e.g., between the first microphone and the second microphone), enabling the device 110 to determine the direction of an audio source relative to the device 110. Thus, the double-talk detection component 130 may generate decision data that indicates the current system conditions, a number of peak(s) represented in the LMS filter coefficient data, and/or the location(s) of the peak(s) without departing from the disclosure.

As illustrated in FIG. 1, the device 110 may receive (140) first microphone audio data from a first microphone 112a, may receive (142) second microphone audio data from a second microphone 112b, and may generate (144) third microphone audio data using an adaptive filter. The device 110 may determine (146) a plurality of filter coefficient values associated with the adaptive filter and determine (148) a number of peaks represented in the filter coefficient values. In some examples, the device 110 may optionally determine (150) location(s) associated with the peak(s). Finally, the device 110 may determine (152) decision data based on the number of peaks and the location(s). For example, the device 110 may track a first location of the loudspeaker(s) 114 over time and track a second location of the user 10 over time and distinguish between the loudspeaker(s) 114 and the user 10 based on the location(s) of the peak(s).

While the above description provided a summary of how to perform double-talk detection using speech detection models, the following paragraphs will describe FIG. 1 in greater detail.

For ease of illustration, some audio data may be referred to as a signal, such as a far-end reference signal x(t), an echo signal y(t), an echo estimate signal y'(t), a microphone signal z(t), error signal m(t) or the like. However, the signals may be comprised of audio data and may be referred to as audio data (e.g., far-end reference audio data x(t), echo audio data y(t), echo estimate audio data y'(t), microphone audio data z(t), error audio data m(t)) without departing from the disclosure.

During a communication session, the device 110 may receive a far-end reference signal x(t) (e.g., playback audio data) from a remote device/remote server(s) via the network(s) 199 and may generate output audio (e.g., playback audio) based on the far-end reference signal x(t) using the one or more loudspeaker(s) 114. Using one or more microphone(s) 112 in the microphone array, the device 110 may capture input audio as microphone signal z(t) (e.g., near-end reference audio data, input audio data, microphone audio data, etc.) and may send the microphone signal z(t) to the remote device/remote server(s) via the network(s) 199.

In some examples, the device 110 may send the microphone signal z(t) to the remote device as part of a Voice over Internet Protocol (VoIP) communication session. For example, the device 110 may send the microphone signal z(t) to the remote device either directly or via remote server(s) and may receive the far-end reference signal x(t) from the remote device either directly or via the remote server(s). However, the disclosure is not limited thereto and in some examples, the device 110 may send the microphone signal z(t) to the remote server(s) in order for the remote server(s) to determine a voice command. For example, during a communication session the device 110 may receive the far-end reference signal x(t) from the remote device and may generate the output audio based on the far-end reference signal x(t). However, the microphone signal z(t) may be separate from the communication session and may include a voice command directed to the remote server(s). Therefore, the device 110 may send the microphone signal z(t) to the remote server(s) and the remote server(s) may determine a voice command represented in the microphone signal z(t) and may perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over loudspeaker(s) 114, capture audio using microphone(s) 112, or the like), multimedia devices (e.g., play videos using a display, such as a television, computer, tablet or the like), smart home devices (e.g., change temperature controls, turn on/off lights, lock/unlock doors, etc.) or the like.

The device 110 may operate using a microphone array 114 comprising multiple microphones, where beamforming techniques may be used to isolate desired audio including speech. In audio systems, beamforming refers to techniques that are used to isolate audio from a particular direction in a multi-directional audio capture system. Beamforming may be particularly useful when filtering out noise from non-desired directions. Beamforming may be used for various tasks, including isolating voice commands to be executed by a speech-processing system.

One technique for beamforming involves boosting audio received from a desired direction while dampening audio received from a non-desired direction. In one example of a beamformer system, a fixed beamformer unit employs a filter-and-sum structure to boost an audio signal that originates from the desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer unit may also incorporate an adaptive beamformer unit/noise canceller that can adaptively cancel noise from different directions depending on audio conditions.

In audio systems, acoustic echo cancellation (AEC) processing refers to techniques that are used to recognize when a device has recaptured sound via microphone(s) after some delay that the device previously output via loudspeaker(s). The device may perform AEC processing by subtracting a delayed version of the original audio signal (e.g., far-end reference signal $x(t)$) from the captured audio (e.g., microphone signal $z(t)$), producing a version of the captured audio that ideally eliminates the "echo" of the original audio signal, leaving only new audio information. For example, if someone were singing karaoke into a microphone while prerecorded music is output by a loudspeaker, AEC processing can be used to remove any of the recorded music from the audio captured by the microphone, allowing the singer's voice to be amplified and output without also reproducing a delayed "echo" of the original music. As another example, a media player that accepts voice commands via a microphone can use AEC processing to remove reproduced sounds corresponding to output media that are captured by the microphone, making it easier to process input voice commands.

As an alternative to generating the reference signal based on the playback audio data, Adaptive Reference Algorithm (ARA) processing may generate an adaptive reference signal based on the input audio data. To illustrate an example, the ARA processing may perform beamforming using the input audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform Adaptive Interference Cancellation (AIC) (e.g., adaptive acoustic interference cancellation) by removing the reference signal from the target signal. As the input audio data is not limited to the echo signal, the ARA processing may remove other acoustic noise represented in the input audio data in addition to removing the echo. Therefore, the ARA processing may be referred to as performing AIC, adaptive noise cancellation (ANC), AEC, and/or the like without departing from the disclosure.

As discussed in greater detail below, the device 110 may include an adaptive beamformer and may be configured to perform AIC using the ARA processing to isolate the speech in the input audio data. The adaptive beamformer may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal strength values or signal quality metrics (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the adaptive beamformer may identify the reference signal(s) based on the signal strength values and/or using other inputs without departing from the disclosure. Thus, the target signal(s) and/or the reference signal(s) selected by the adaptive beamformer may vary, resulting in different filter coefficient values over time.

As discussed above, the device 110 may perform beamforming (e.g., perform a beamforming operation to generate beamformed audio data corresponding to individual directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones in the microphone array 114 (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, the device 110 may perform the directional calculations by applying filters to the input audio signals using filter coefficients associated with specific directions. For example, the device 110 may perform a first directional calculation by applying first filter coefficients to the input audio signals to generate the first beamformed audio data and may perform a second directional calculation by applying second filter coefficients to the input audio signals to generate the second beamformed audio data.

The filter coefficients used to perform the beamforming operation may be calculated offline (e.g., preconfigured ahead of time) and stored in the device 110. For example, the device 110 may store filter coefficients associated with hundreds of different directional calculations (e.g., hundreds of specific directions) and may select the desired filter coefficients for a particular beamforming operation at runtime (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficients) being referred to as a "first beam" corresponding to the first direction, the second directional calculation (e.g., second filter coefficients) being referred to as a "second beam" corresponding to the second direction, and so on. Thus, the device 110 stores hundreds of "beams" (e.g., directional calculations and associated filter coefficients) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficients used to generate the first beam.

Prior to sending the microphone signal z(t) to the remote device/remote server(s), the device 110 may perform acoustic echo cancellation (AEC), adaptive interference cancellation (AIC), residual echo suppression (RES), and/or other audio processing to isolate local speech captured by the microphone(s) 112 and/or to suppress unwanted audio data (e.g., echoes and/or noise). As illustrated in FIG. 1, the device 110 may receive the far-end reference signal x(t) (e.g., playback audio data) and may generate playback audio (e.g., echo signal y(t)) using the loudspeaker(s) 114. The far-end reference signal x(t) may be referred to as a far-end reference signal (e.g., far-end reference audio data), a playback signal (e.g., playback audio data) or the like. The one or more microphone(s) 112 in the microphone array may capture a microphone signal z(t) (e.g., microphone audio data, near-end reference signal, input audio data, etc.), which may include the echo signal y(t) along with near-end speech s(t) from the user 10 and noise n(t).

To isolate the local speech (e.g., near-end speech s(t) from the user 10), the device 110 may include an AIC component 120 that selects target signal(s) and reference signal(s) from the beamformed audio data and generates an error signal m(t) by removing the reference signal(s) from the target signal(s). As the AIC component 120 does not have access to the echo signal y(t) itself, the reference signal(s) are selected as an approximation of the echo signal y(t). Thus, when the AIC component 120 removes the reference signal(s) from the target signal(s), the AIC component 120 is removing at least a portion of the echo signal y(t). In addition, the reference signal(s) may include the noise n(t) and other acoustic interference. Therefore, the output (e.g., error signal m(t)) of the AIC component 120 may include the near-end speech s(t) along with portions of the echo signal y(t) and/or the noise n(t) (e.g., difference between the reference signal(s) and the actual echo signal y(t) and noise n(t)).

To improve the audio data, in some examples the device 110 may include a residual echo suppressor (RES) component 122 to dynamically suppress unwanted audio data (e.g., the portions of the echo signal y(t) and the noise n(t) that were not removed by the AIC component 120). For example, when the far-end reference signal x(t) is active and the near-end speech s(t) is not present in the error signal m(t), the RES component 122 may attenuate the error signal m(t) to generate final output audio data r(t). This removes and/or reduces the unwanted audio data from the final output audio data r(t). However, when near-end speech s(t) is present in the error signal m(t), the RES component 122 may act as a pass-through filter and pass the error signal m(t) without attenuation. This avoids attenuating the near-end speech s(t).

Residual echo suppression (RES) processing is performed by selectively attenuating, based on individual frequency bands, first audio data output by the AIC component 120 to generate second audio data output by the RES component. For example, performing RES processing may determine a gain for a portion of the first audio data corresponding to a specific frequency band (e.g., 100 Hz to 200 Hz) and may attenuate the portion of the first audio data based on the gain to generate a portion of the second audio data corresponding to the specific frequency band. Thus, a gain may be determined for each frequency band and therefore the amount of attenuation may vary based on the frequency band.

The device 110 may determine the gain based on the attenuation value. For example, a low attenuation value $\alpha_1$ (e.g., closer to a value of zero) results in a gain that is closer to a value of one and therefore an amount of attenuation is relatively low. Thus, the RES component 122 acts similar to a pass-through filter for the low frequency bands. An energy level of the second audio data is therefore similar to an energy level of the first audio data. In contrast, a high attenuation value $\alpha_2$ (e.g., closer to a value of one) results in a gain that is closer to a value of zero and therefore an amount of attenuation is relatively high. Thus, the RES component 122 attenuates the high frequency bands, such that an energy level of the second audio data is lower than an energy level of the first audio data. Therefore, the energy level of the second audio data corresponding to the high frequency bands is lower than the energy level of the second audio data corresponding to the low frequency bands.

In some examples, during near-end single-talk conditions (e.g., when the far-end speech is not present), the RES component 122 may act as a pass through filter and pass the error signal m(t) without attenuation. That includes when the near-end speech is not present, which is referred to as "no-talk" or no-speech conditions, and when the near-end speech is present, which is referred to as "near-end single-talk." Thus, the RES component 122 may determine a gain with which to attenuate the error signal m(t) using a first attenuation value ($\alpha_1$) for both low frequencies and high frequencies. In contrast, when the far-end speech is present and the near-end speech is not present, which is referred to as "far-end single-talk," the RES component 122 may act as an attenuator and may attenuate the error signal m(t) based on a gain calculated using a second attenuation value (aa) for low frequencies and high frequencies. For ease of illustration, the first attenuation value $\alpha_1$ may be referred to as a "low attenuation value" and may be smaller (e.g., closer to a value of zero) than the second attenuation value aa. Similarly, the second attenuation value $\alpha_2$ may be referred to as a "high attenuation value" and may be larger (e.g., closer to a value of one) than the first attenuation value $\alpha_1$. However, the disclosure is not limited thereto and in some examples the first attenuation value $\alpha_1$ may be higher than the second attenuation value as without departing from the disclosure.

When the near-end speech is present and the far-end speech is present, "double-talk" occurs. During double-talk conditions, the RES component 122 may pass low frequencies of the error signal m(t) while attenuating high frequencies of the error signal m(t). For example, the RES component 122 may determine a gain with which to attenuate the error signal m(t) using the low attenuation value ($\alpha_1$) for low frequencies and the high attenuation value ($\alpha_2$) for high frequencies.

An audio signal is a representation of sound and an electronic representation of an audio signal may be referred to as audio data, which may be analog and/or digital without departing from the disclosure. For ease of illustration, the disclosure may refer to either audio data (e.g., far-end reference audio data or playback audio data, microphone audio data, near-end reference data or input audio data, etc.) or audio signals (e.g., playback signal, far-end reference signal, microphone signal, near-end reference signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

As used herein, audio signals or audio data (e.g., far-end reference audio data, near-end reference audio data, microphone audio data, or the like) may correspond to a specific range of frequency bands. For example, far-end reference audio data and/or near-end reference audio data may correspond to a human hearing range (e.g., 20 Hz-20 kHz), although the disclosure is not limited thereto.

Far-end reference audio data (e.g., far-end reference signal x(t)) corresponds to audio data that will be output by the loudspeaker(s) 114 to generate playback audio (e.g., echo signal y(t)). For example, the device 110 may stream music or output speech associated with a communication session (e.g., audio or video telecommunication). In some examples, the far-end reference audio data may be referred to as playback audio data, loudspeaker audio data, and/or the like without departing from the disclosure. For ease of illustration, the following description will refer to the playback audio data as far-end reference audio data. As noted above, the far-end reference audio data may be referred to as far-end reference signal(s) x(t) without departing from the disclosure.

Microphone audio data corresponds to audio data that is captured by the microphone(s) 114 prior to the device 110 performing audio processing such as AIC processing. The microphone audio data may include local speech s(t) (e.g., an utterance, such as near-end speech generated by the user 10), an "echo" signal y(t) (e.g., portion of the playback audio captured by the microphone(s) 114), acoustic noise n(t) (e.g., ambient noise in an environment around the device 110), and/or the like. As the microphone audio data is captured by the microphone(s) 114 and captures audio input to the device 110, the microphone audio data may be referred to as input audio data, near-end audio data, and/or the like without departing from the disclosure. For ease of illustration, the following description will refer to microphone audio data and near-end reference audio data interchangeably. As noted above, the near-end reference audio data/microphone audio data may be referred to as a near-end reference signal or microphone signal z(t) without departing from the disclosure.

An "echo" signal y(t) corresponds to a portion of the playback audio that reaches the microphone(s) 114 (e.g., portion of audible sound(s) output by the loudspeaker(s) 114 that is recaptured by the microphone(s) 112) and may be referred to as an echo or echo data y(t).

Output audio data corresponds to audio data after the device 110 performs audio processing (e.g., AIC processing, ANC processing, AEC processing, and/or the like) to isolate the local speech s(t). For example, the output audio data r(t) corresponds to the microphone audio data z(t) after subtracting the reference signal(s) (e.g., using adaptive interference cancellation (AIC) component 120), optionally performing residual echo suppression (RES) (e.g., using the RES component 122), and/or other audio processing known to one of skill in the art. As noted above, the output audio data may be referred to as output audio signal(s) without departing from the disclosure, and one of skill in the art will recognize that the output audio data may also be referred to as an error audio data m(t), error signal m(t) and/or the like.

For ease of illustration, the following description may refer to generating the output audio data by performing AIC processing and RES processing. However, the disclosure is not limited thereto, and the device 110 may generate the output audio data by performing AIC processing, RES processing, other audio processing, and/or a combination thereof. Additionally or alternatively, the disclosure is not limited to AIC processing and, in addition to or instead of performing AIC processing, the device 110 may perform other processing to remove or reduce unwanted speech $s_2(t)$ (e.g., speech associated with a second user), unwanted acoustic noise n(t), and/or echo signals y(t), such as acoustic echo cancellation (AEC) processing, adaptive noise cancellation (ANC) processing, and/or the like without departing from the disclosure.

FIG. 2 illustrates an example decision chart for varying parameters based on system conditions according to examples of the present disclosure. As illustrated in decision chart 210, the device 110 may distinguish between different system conditions. For example, the device 110 may determine whether no-speech conditions 220 are present (e.g., no near-end speech and no far-end speech, represented by near-end speech data 212a and far-end speech data 214a), near-end single-talk conditions 230 are present (e.g., near-end speech but no far-end speech, represented by near-end speech data 212b and far-end speech data 214a), far-end single-talk conditions 240 are present (e.g., far-end speech but no near-end speech, represented by near-end speech data 212a and far-end speech data 214b), or double-talk conditions 250 are present (e.g., near-end speech and far-end speech, represented by near-end speech data 212b and far-end speech data 214b).

The device 110 may select parameters based on whether near-end speech is detected. For example, when far-end speech is detected and near-end speech is not detected (e.g., during far-end single-talk conditions 240), the device 110 may select parameters to reduce and/or suppress echo signals represented in the output audio data. As illustrated in FIG. 2, this may include performing dynamic reference beam selection, performing adaptive interference cancellation (AIC) using an adaptive filter, adapting AIC filter coefficients for the adaptive filter, and/or performing RES processing. In contrast, when near-end speech is detected (e.g., during near-end single-talk conditions 230 and/or double-talk conditions 250), the device 110 may select parameters to improve a quality of the speech in the output audio data (e.g., avoid cancelling and/or suppressing the near-end speech). As illustrated in FIG. 2, this may include freezing (e.g., disabling) reference beam selection, bypassing AIC processing (e.g., during near-end single talk conditions 230) or performing AIC cancellation using existing AIC filter coefficients (e.g., during double-talk conditions 250), freezing (e.g., disabling) AIC filter coefficient adaptation for the adaptive filter, and disabling RES processing.

Dynamic reference beam selection, which will be described in greater detail below with regard to FIGS. 5A-5C, refers to adaptively selecting a reference beam based on which beamformed audio data has a highest energy. For example, the device 110 may dynamically select the reference beam based on which beamformed audio data has the largest amplitude and/or highest power, thus selecting the loudest beam as a reference beam to be removed during noise cancellation. During far-end single-talk conditions, this works well as the loudspeaker(s) 114 generating output audio based on the far-end reference signal are louder than other sources of noise and therefore Adaptive Reference Algorithm (ARA) processing selects the beamformed audio data associated with the loudspeaker(s) 114 as a reference signal. Thus, the adaptive interference cancellation (AIC) component 120 removes the acoustic noise and corresponding echo from the output audio data. However, during near-end single-talk conditions and/or double-talk conditions, the near-end speech may be louder than the loudspeaker(s) 114 and therefore the ARA processing may incorrectly select the beamformed audio data associated with the near-end speech as a reference signal. Thus, instead of removing noise and/or echo and isolating the local speech, the AIC component 120 would inadvertently remove portions of the local speech. Therefore, freezing (e.g., disabling) reference beam selection during near-end single-talk conditions 230 and/or double-talk conditions 250 ensures that the reference beam is selected only during far-end single-talk conditions 240 and corresponds to the loudspeaker(s) 114.

Similarly, the device 110 may adapt filter coefficients associated with the AIC component 120 during far-end single-talk conditions but may freeze (e.g., disable) filter coefficient adaptation during near-end single-talk conditions 230 and double-talk conditions 250. For example, in order to remove an echo associated with the far-end reference signal, the device 110 adapts the filter coefficients during far-end single-talk conditions 240 to minimize an "error signal" m(t) (e.g., output of the AIC component). However, the error signal m(t) should not be minimized during near-end single-talk conditions 230 and/or double-talk conditions 250, as the output of the AIC component 120 includes the local speech. Therefore, because continuing to adapt the filter coefficients during near-end single-talk conditions and/or double-talk conditions would result in the AIC component 120 adapting to the local speech, the device 110 freezes filter coefficient adaptation during these system conditions. Freezing filter coefficient adaptation refers to the device 110 disabling filter coefficient adaptation, such as by storing current filter coefficient values and using the stored filter coefficient values until filter coefficient adaptation is enabled again. Once filter coefficient adaptation is enabled (e.g., unfrozen), the device 110 dynamically adapts the filter coefficient values.

During double-talk conditions 250, the device 110 may perform AIC processing using the frozen AIC filter coefficients (e.g., filter coefficient values stored at the end of the most recent far-end single-talk conditions 240). Thus, the AIC component 120 may use the frozen AIC filter coefficients to remove portions of the echo signal y(t) and/or the noise n(t) while leaving the local speech s(t). However, during near-end single-talk conditions 230, the device 110 may bypass AIC processing entirely. As there is no far-end speech being output by the loudspeaker(s) 114, the device 110 does not need to perform the AIC processing as the microphone audio signal z(t) does not include the echo signal y(t). In addition, as the reference signals may capture a portion of the local speech s(t), performing the AIC processing may remove portions of the local speech s(t) from the error signal m(t). Therefore, bypassing the AIC processing ensures that the local speech s(t) is not distorted or suppressed inadvertently by the AIC component 120.

Finally, residual echo suppression (RES) processing further attenuates or suppresses audio data output by the AIC component 122. During far-end single-talk conditions, this audio data only includes noise and/or far-end speech, and therefore performing RES processing improves the audio data output by the device 110 during a communication session. However, during near-end single-talk conditions and/or double-talk conditions, this audio data may include local speech, and therefore performing RES processing attenuates at least portions of the local speech and degrades the audio data output by the device 110 during the communication session. Therefore, the device 110 may enable RES processing and/or apply aggressive RES processing during far-end single-talk conditions (e.g., to suppress unwanted noise and echo), but may disable RES and/or apply slight RES during near-end single-talk conditions and double-talk conditions (e.g., to improve a quality of the local speech).

As illustrated in FIG. 2, the device 110 does not set specific parameters during no speech conditions 220. As there is no far-end speech or near-end speech, output audio data output by the device 110 should be relatively low in energy. In addition, either performing adaptive noise cancellation processing and/or residual echo suppression processing may further suppress unwanted noise from the output audio data. Thus, first parameters associated with near-end single-talk conditions 230, second parameters associated with far-end single-talk conditions 240, and/or third parameters associated with double-talk conditions 250 may be applied during no speech conditions 220 without departing from the disclosure. As the device 110 may easily determine that the echo signal and therefore far-end speech is faint during no-speech conditions 220, the device 110 typically applies the first parameters associated with near-end single-talk conditions 230, although the disclosure is not limited thereto.

Figure 4A:
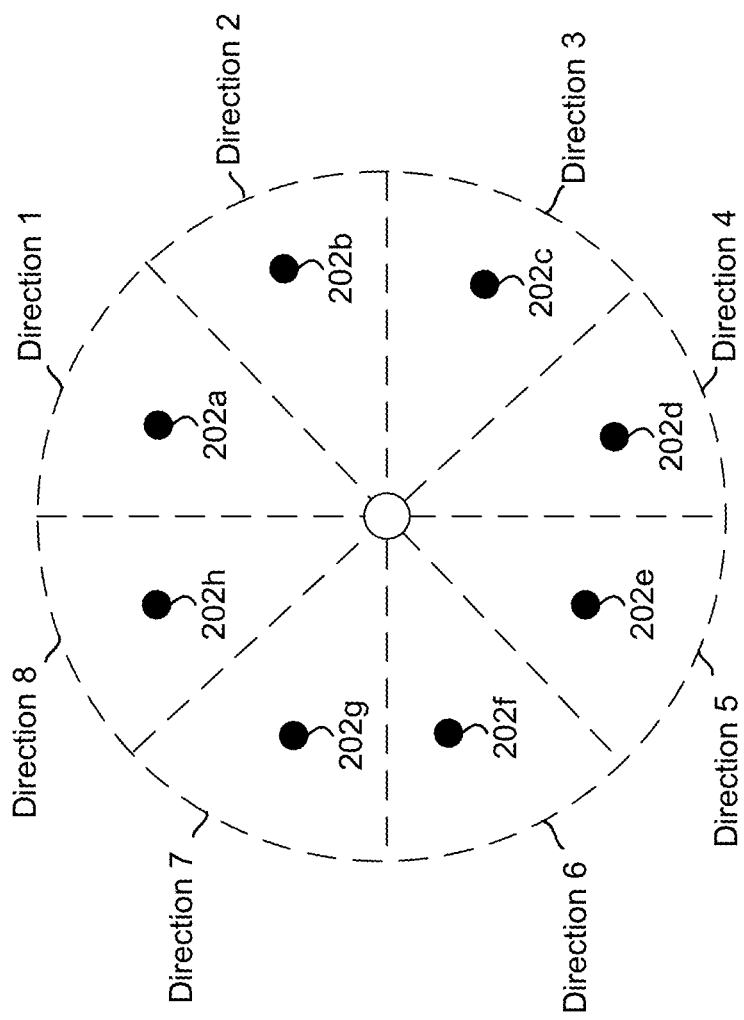
FIG. 4A illustrates associating directions with microphones of a microphone array according to embodiments of the present disclosure.
Figure 4C:
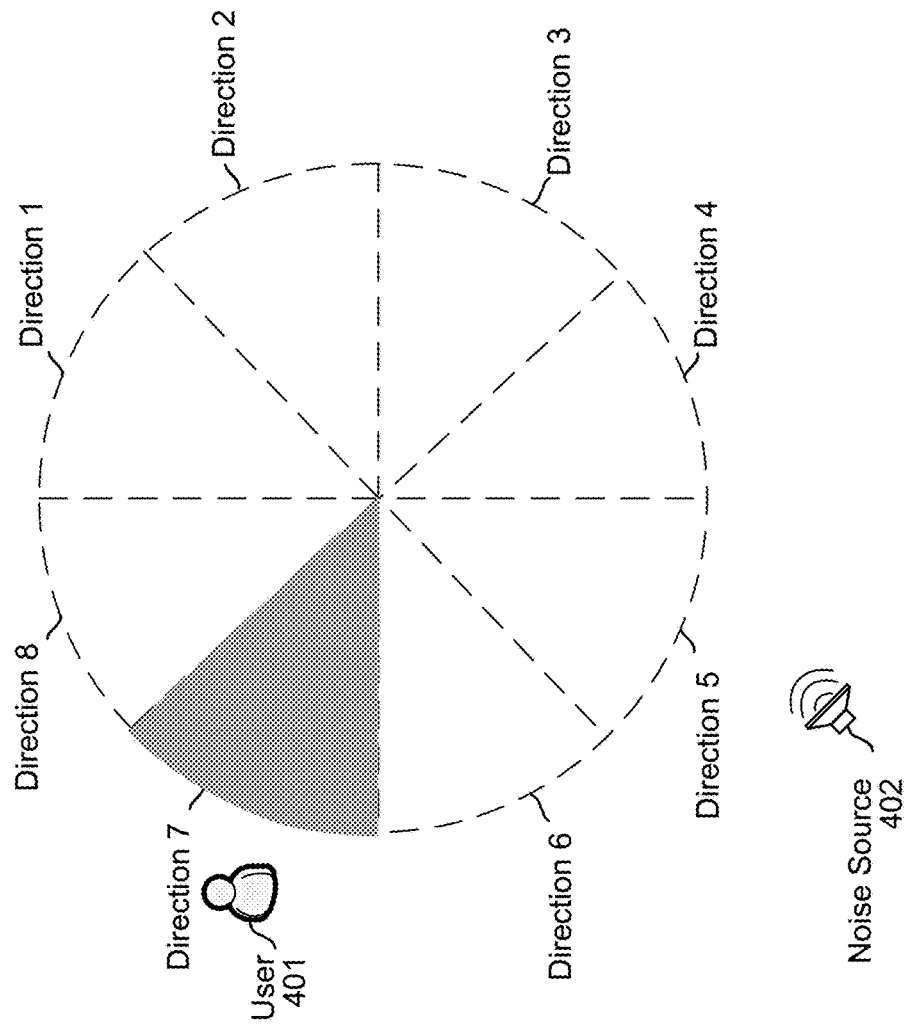

Further details of the device operation are described below following a discussion of directionality in reference to FIGS. 3-4C.

As illustrated in FIG. 3, a device 110 may include, among other components, a microphone array 302 including a plurality of microphone(s) 312, one or more loudspeaker(s) 114, a beamformer unit (as discussed below), or other components. The microphone array 302 may include a number of different individual microphones 312. In the example configuration of FIG. 3, the microphone array includes eight (8) microphones, 312a-312h. The individual microphones 312 may capture sound and pass the resulting audio signal created by the sound to a downstream component, such as an analysis filterbank discussed below. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Using such direction isolation techniques, a device 110 may isolate directionality of audio sources. As shown in FIG. 4A, a particular direction may be associated with a particular microphone 312 of a microphone array, where the azimuth angles for the plane of the microphone array may be divided into bins (e.g., 0-45 degrees, 46-90 degrees, and so forth) where each bin direction is associated with a microphone in the microphone array. For example, direction 1 is associated with microphone 312a, direction 2 is associated with microphone 312b, and so on. Alternatively, particular directions and/or beams may not necessarily be associated with a specific microphone without departing from the present disclosure. For example, the device 110 may include any number of microphones and/or may isolate any number of directions without departing from the disclosure.

To isolate audio from a particular direction the device may apply a variety of audio filters to the output of the microphones where certain audio is boosted while other audio is dampened, to create isolated audio data corresponding to a particular direction, which may be referred to as a beam. While in some examples the number of beams may correspond to the number of microphones, the disclosure is not limited thereto and the number of beams may vary from the number of microphones without departing from the disclosure. For example, a two-microphone array may be processed to obtain more than two beams, using filters and beamforming techniques to isolate audio from more than two directions. Thus, the number of microphones may be more than, less than, or the same as the number of beams. The beamformer unit of the device may have a fixed beamformer (FBF) unit and/or an adaptive beamformer (ABF) unit processing pipeline for each beam, as explained below.

The device 110 may use various techniques to determine the beam corresponding to the look-direction. For example, if audio is first detected by a particular microphone, the device 110 may determine that the source of the audio is associated with the direction of the microphone in the array. Other techniques may include determining which microphone detected the audio with a largest amplitude (which in turn may result in a highest strength of the audio signal portion corresponding to the audio). Other techniques (either in the time domain or in the sub-band domain) may also be used such as calculating a signal-to-noise ratio (SNR) for each beam, performing voice activity detection (VAD) on each beam, or the like.

To illustrate an example, if audio data corresponding to a user's speech is first detected and/or is most strongly detected by microphone 312g, the device 110 may determine that a user 401 is located at a location in direction 7. Using a FBF unit or other such component, the device 110 may isolate audio data coming from direction 7 using techniques known to the art and/or explained herein. Thus, as shown in FIG. 4B, the device 110 may boost audio data coming from direction 7, thus increasing the amplitude of audio data corresponding to speech from the user 401 relative to other audio data captured from other directions. In this manner, noise from diffuse sources that is coming from all the other directions will be dampened relative to the desired audio (e.g., speech from user 401) coming from direction 7.

One drawback to the FBF unit approach is that it may not function as well in dampening/canceling noise from a noise source that is not diffuse, but rather coherent and focused from a particular direction. For example, as shown in FIG. 4C, a noise source 402 may be coming from direction 5 but may be sufficiently loud that noise canceling/beamforming techniques using an FBF unit alone may not be sufficient to remove all the undesired audio coming from the noise source 402, thus resulting in an ultimate output audio signal determined by the device 110 that includes some representation of the desired audio resulting from user 401 but also some representation of the undesired audio resulting from noise source 402.

Conventional systems isolate the speech in the input audio data by performing acoustic echo cancellation (AEC) to remove the echo signal from the input audio data. For example, conventional acoustic echo cancellation may generate a reference signal based on the playback audio data and may remove the reference signal from the input audio data to generate output audio data representing the speech.

As an alternative to generating the reference signal based on the playback audio data, Adaptive Reference Algorithm (ARA) processing may generate an adaptive reference signal based on the input audio data. The ARA processing is discussed in greater detail above with regard to FIG. 1. For example, the device 110 may perform beamforming using the input audio data to generate a plurality of audio signals (e.g., beamformed audio data) corresponding to particular directions (e.g., a first audio signal corresponding to a first direction, a second audio signal corresponding to a second direction, etc.). After beamforming, the device 110 may optionally perform adaptive interference cancellation using the ARA processing on the beamformed audio data. For example, after generating the plurality of audio signals, the device 110 may determine one or more target signal(s), determine one or more reference signal(s), and generate output audio data by subtracting at least a portion of the reference signal(s) from the target signal(s). For example, the ARA processing may select the first audio signal as a target signal (e.g., the first audio signal includes a representation of speech) and the second audio signal as a reference signal (e.g., the second audio signal includes a representation of the echo and/or other acoustic noise), and may perform AIC by removing (e.g., subtracting) the reference signal from the target signal.

To improve noise cancellation, the AIC component may amplify audio signals from two or more directions other than the look direction (e.g., target signal). These audio signals represent noise signals so the resulting amplified audio signals may be referred to as noise reference signals. The device 110 may then weight the noise reference signals, for example using filters, and combine the weighted noise reference signals into a combined (weighted) noise reference signal. Alternatively the device 110 may not weight the noise reference signals and may simply combine them into the combined noise reference signal without weighting. The device 110 may then subtract the combined noise reference signal from the target signal to obtain a difference (e.g., noise-cancelled audio data). The device 110 may then output that difference, which represents the desired output audio signal with the noise removed. The diffuse noise is removed by the FBF unit when determining the target signal and the directional noise is removed when the combined noise reference signal is subtracted.

The device 110 may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal strength values (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the device 110 may identify the reference signal(s) based on the signal strength values and/or using other inputs without departing from the disclosure. Thus, the target signal(s) and/or the reference signal(s) selected by the device 110 may vary, resulting in different filter coefficient values over time.

FIGS. 5A-5C illustrate dynamic and fixed reference beam selection according to embodiments of the present disclosure. As discussed above, Adaptive Reference Algorithm (ARA) processing may generate an adaptive reference signal based on the microphone audio data. To illustrate an example, the ARA processing may perform beamforming using the microphone audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform acoustic echo cancellation by removing (e.g., subtracting) the reference signal from the target signal. As the microphone audio data is not limited to the echo signal, the ARA processing may remove other acoustic noise represented in the microphone audio data in addition to removing the echo. Therefore, the ARA processing may be referred to as performing adaptive interference cancellation (AIC) (e.g., adaptive acoustic interference cancellation), adaptive noise cancellation (ANC), and/or acoustic echo cancellation (AEC) without departing from the disclosure.

In some examples, the ARA processing may dynamically select the reference beam based on which beamformed audio data has the largest amplitude and/or highest power. Thus, the ARA processing adaptively selects the reference beam depending on the power associated with each beam. This technique works well during far-end single-talk conditions, as the loudspeaker(s) 114 generating output audio based on the far-end reference signal are louder than other sources of noise and therefore the ARA processing selects the beamformed audio data associated with the loudspeaker(s) 114 as a reference signal.

FIG. 5A illustrates an example of dynamic reference beam selection during far-end single-talk conditions. As illustrated in FIG. 5A, the ARA processing selects the beam associated with a noise source 502 (e.g., the loudspeaker(s) 114) as the reference beam. Thus, even as the noise source 502 moves between beams (e.g., beginning at direction 7 and moving to direction 1), the ARA processing is able to dynamically select beamformed audio data associated with the noise source 502 as the reference signal. The ARA processing may select beamformed audio data associated with the user 501 (e.g., direction 5) as a target signal, performing adaptive noise cancellation to remove the reference signal from the target signal and generate output audio data.

While this technique works well during far-end single-talk conditions, performing dynamic reference beam selection during near-end single-talk conditions and/or double-talk conditions does not provide good results. For example, during near-end single-talk conditions and/or when local speech generated by a user 501 is louder than the loudspeaker(s) 114 during double-talk conditions, the ARA processing selects the beam associated with the user 501 instead of the beam associated with the noise source 502 as the reference beam.

FIG. 5B illustrates an example of dynamic reference beam selection during near-end single-talk conditions. As illustrated in FIG. 5B, the ARA processing initially selects a first beam associated with a noise source 502 (e.g., direction 7 associated with the loudspeaker(s) 114) as the reference beam. Thus, the ARA processing selects first beamformed audio data associated with the noise source 502 (e.g., direction 7) as the reference signal and selects second beamformed audio data associated with the user 501 (e.g., direction 5) as a target signal, performing adaptive noise cancellation to remove the reference signal from the target signal and generate output audio data.

However, during near-end single-talk conditions the noise source 502 is silent and the ARA processing only detects audio associated with the local speech generated by the user 501. As the local speech is the loudest audio, the ARA processing selects a second beam associated with the user 501 (e.g., direction 5 associated with the local speech) as the reference beam. Thus, the ARA processing selects the second beamformed audio data associated with the user 501 (e.g., direction 5) as the reference signal. Whether the ARA processing selects the second beamformed audio data associated with the user 501 (e.g., direction 5) as a target signal, or selects beamformed audio data in a different direction as the target signal, the output audio data generated by performing adaptive noise cancellation does not include the local speech.

To improve the ARA processing, the device 110 may freeze reference beam selection during near-end single-talk conditions and/or during double-talk conditions. Thus, the ARA processing may dynamically select the reference beam during far-end single-talk conditions, but as soon as local speech is detected (e.g., near-end single-talk conditions and/or double-talk conditions are detected), the ARA processing may store the most-recently selected reference beam and use this reference beam until far-end single-talk conditions resume. For example, during near-end single-talk conditions and/or when local speech generated by a user 501 is louder than the loudspeaker(s) 114 during double-talk conditions, the ARA processing ignores the beam with the most power and continues to use the reference beam previously selected during far-end single-talk conditions, as this reference beam is most likely to be associated with a noise source.

FIG. 5C illustrates an example of freezing reference beam selection during near-end single-talk conditions. As illustrated in FIG. 5C, the ARA processing initially selects a first beam associated with a noise source 502 (e.g., direction 7 associated with the loudspeaker(s) 114) as the reference beam during far-end single-talk conditions. Thus, the ARA processing selects first beamformed audio data associated with the noise source 502 (e.g., direction 7) as the reference signal and selects second beamformed audio data associated with the user 501 (e.g., direction 5) as a target signal, performing adaptive noise cancellation to remove the reference signal from the target signal and generate output audio data.

When the device 110 detects near-end single-talk conditions, the ARA processing freezes dynamic reference beam selection and stores the first beam associated with the noise source 502 (e.g., direction 7 associated with the loudspeaker(s) 114) as the reference beam until far-end single-talk conditions resume. Thus, during near-end single-talk conditions and/or when local speech generated by the user 501 is louder than the noise source 502 during double-talk conditions, the ARA processing continues to select the first beamformed audio data associated with the noise source 502 (e.g., direction 7) as the reference signal and selects the second beamformed audio data associated with the user 501 (e.g., direction 5) as the target signal, performing adaptive noise cancellation to remove the reference signal from the target signal and generate the output audio data.

As described above with regard to FIG. 2, the device 110 may set a number of parameters differently between far-end single-talk conditions and either near-end single-talk conditions or double-talk conditions. As illustrated in FIG. 5C, the device 110 may perform dynamic reference beam selection during far-end single-talk conditions but may freeze reference beam selection during near-end single-talk conditions and double-talk conditions.

Similarly, the device 110 may adapt filter coefficients associated with an adaptive filter during far-end single-talk conditions but may freeze filter coefficient adaptation during near-end single-talk conditions and double-talk conditions. For example, in order to remove an echo associated with the far-end reference signal, the device adapts the filter coefficients during far-end single-talk conditions to minimize an "error signal" (e.g., output of the AIC component 120). However, the error signal should not be minimized during near-end single-talk conditions and double-talk conditions as the output of the AIC component 120 includes the local speech. Therefore, because continuing to adapt the filter coefficients during near-end single-talk conditions and double-talk conditions would result in the AIC component 120 removing portions of the local speech from the output audio data, the device 110 freezes filter coefficient adaptation. Freezing filter coefficient adaptation refers to the device 110 disabling filter coefficient adaptation, such as by storing current filter coefficient values and using the stored filter coefficient values until filter coefficient adaptation is enabled again. Once filter coefficient adaptation is enabled (e.g., unfrozen), the device 110 dynamically adapts the filter coefficient values.

Finally, the device 110 may enable residual echo suppression (RES) processing and/or apply aggressive RES processing during far-end single-talk conditions (e.g., to suppress unwanted noise and echo), but disable RES processing and/or apply slight RES processing during near-end single-talk conditions and double-talk conditions (e.g., to improve a quality of the local speech).

In some examples, the device 110 may apply different settings, parameters, and/or the like based on whether near-end single talk conditions are present or double-talk conditions are present. For example, the device 110 may apply slightly more audio processing, such as stronger AIC processing, RES processing, and/or the like, during double-talk conditions than during near-end single-talk conditions, in order to remove a portion of the echo signal. Additionally or alternatively, the device 110 may bypass the AIC component 120 and/or the RES component 122 entirely during near-end single talk conditions and not apply AIC processing and/or RES processing without departing from the disclosure.

Figure 6A:
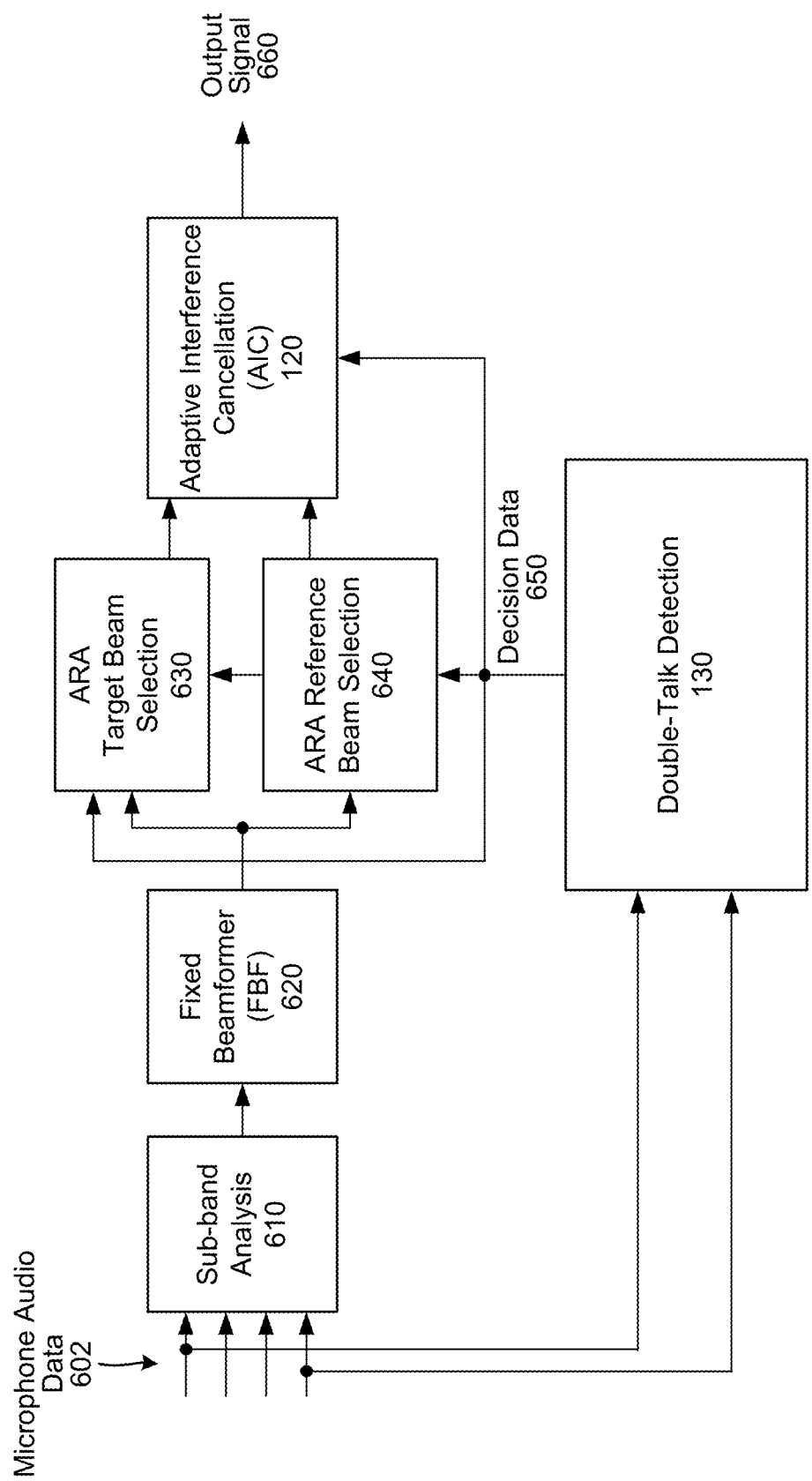
FIGS. 6A-6B illustrate example components for performing double-talk detection according to examples of the present disclosure.
Figure 6B:
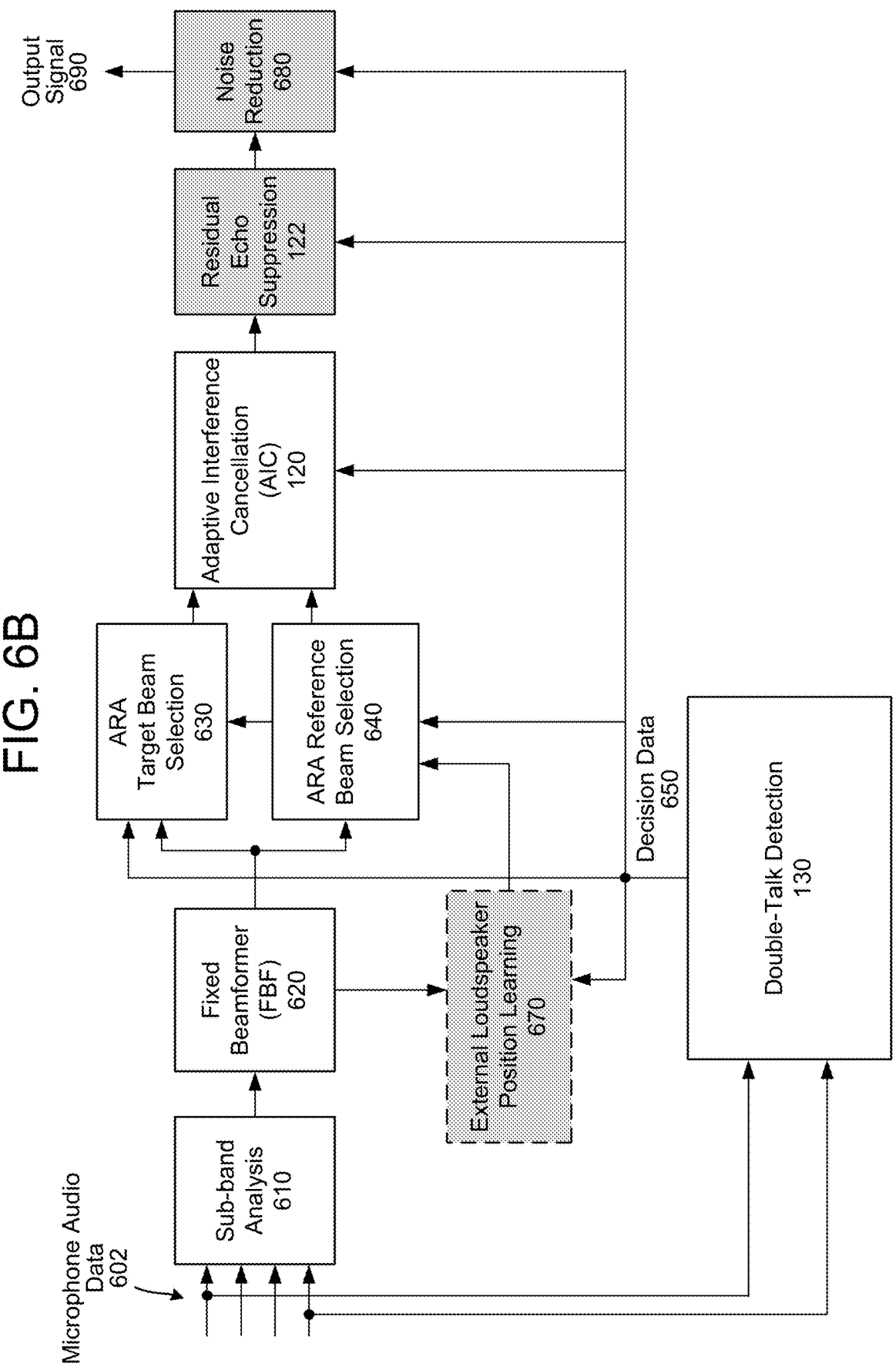

FIGS. 6A-6B illustrate example components for performing double-talk detection according to examples of the present disclosure. As illustrated in FIG. 6A, one or more of the microphone(s) 112 may generate microphone audio data 602 (e.g., near-end reference signal) in a time domain, which may be input to sub-band analysis 610 prior to performing audio processing in a frequency domain. For example, the sub-band analysis 610 may include a uniform discrete Fourier transform (DFT) filterbank to convert the microphone audio data 602 from the time domain into the sub-band domain (e.g., converting to the frequency domain and then separating different frequency ranges into a plurality of individual sub-bands). Therefore, the audio signal X may incorporate audio signals corresponding to multiple different microphones as well as different sub-bands (i.e., frequency ranges) as well as different frame indices (i.e., time ranges). Thus, the audio signal from the mth microphone may be represented as $X_m(k, n)$, where k denotes the sub-band index and n denotes the frame index. The combination of all audio signals for all microphones for a particular sub-band index frame index may be represented as $X(k,n)$.

After being converted to the sub-band domain, the microphone audio data may be input to a fixed beamformer (FBF) 620, which may perform beamforming on the near-end reference signal. For example, the FBF 620 may apply a variety of audio filters to the output of the sub-band analysis 610, where certain audio data is boosted while other audio data is dampened, to create beamformed audio data corresponding to a particular direction, which may be referred to as a beam. The FBF 620 may generate beamformed audio data using any number of beams without departing from the disclosure.

The beamformed audio data output by the FBF 60 may be sent to Adaptive Reference Algorithm (ARA) target beam selection component 630 and/or ARA reference beam selection component 640. As discussed above with regard to FIGS. 5A-5C, ARA processing may dynamically select one or more of the beams output by the FBF 620 as target signal(s) as well as one or more of the beams output by the FBF 620 as reference signal(s) with which to perform AIC processing. Thus, the ARA target beam selection component 630 may select one or more beams as target beam(s), identify a portion of the beamformed audio data corresponding to the target beam(s) as target signal(s) (e.g., first beamformed audio), and send the target signal(s) to an adaptive interference cancellation (AIC) component 120. Similarly, the ARA reference beam selection component 6N40 may select one or more beams as reference beam(s), identify a portion of the beamformed audio data corresponding to the reference beam(s) as reference signal(s) (e.g., second beamformed audio), and send the reference signal(s) to the AIC component 120.

The AIC component 120 may generate an output signal 660 by subtracting the reference signal(s) from the target signal(s). For example, the AIC component 120 may generate the output signal 660 by subtracting the second beamformed audio data associated with the reference beam(s) from the first beamformed audio data associated with the target beam(s).

The double-talk detection component 130 may receive the microphone audio data 602 corresponding to two microphones 112 and may generate decision data 650. For example, as will be described in greater detail below with regard to FIG. 7, the double-talk detection component 130 may include an adaptive filter that performs AIC processing using a first microphone signal as a target signal and a second microphone signal as a reference signal. To avoid confusion with the adaptive filter associated with the AIC component 120, the adaptive filter associated with the double-talk detection component 130 may be referred to as a least mean squares (LMS) adaptive filter, and corresponding filter coefficient values may be referred to as LMS filter coefficient data. Based on the LMS filter coefficient data of the adaptive filter, the double-talk detection component 130 may determine if near-end single-talk conditions, far-end single-talk conditions, or double-talk conditions are present. For example, the double-talk detection component 130 may distinguish between single-talk conditions and double-talk conditions based on a number of peaks represented in the LMS filter coefficient data. Thus, a single peak corresponds to single-talk conditions, whereas two or more peaks may correspond to double-talk conditions.

In some examples, the double-talk detection component 130 may only update the LMS filter coefficients for the LMS adaptive filter when a meaningful signal is detected. For example, the LMS filter coefficients will not be updated during no speech conditions 220 (e.g., speech silence). The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

In some examples, a VAD detector may detect whether voice activity (i.e., speech) is present in the post-FFT waveforms associated with the microphone audio data (e.g., frequency domain framed audio data output by the sub-band analysis component 610). The VAD detector (or other components) may also be configured in a different order, for example the VAD detector may operate on the microphone audio data 602 in the time domain rather than in the frequency domain without departing from the disclosure. Various different configurations of components are possible.

If there is no speech in the microphone audio data 602, the device 110 discards the microphone audio data 602 (i.e., removes the audio data from the processing stream) and/or doesn't update the LMS filter coefficients. If, instead, the VAD detector detects speech in the microphone audio data 602, the device 110 performs double-talk detection on the microphone audio data 602 and/or updates the LMS filter coefficients of the LMS adaptive filter.

In some examples, the double-talk detection component 130 may receive additional input not illustrated in FIG. 6A. For example, the device 110 may separately determine whether far-end speech is present in the microphone audio data 602 using various techniques known to one of skill in the art. When the device 110 determines that far-end speech is not present in the microphone audio data 602, the double-talk detection component 130 determines that near-end single-talk conditions are present, regardless of a number of peaks represented in the LMS filter coefficient data (e.g., a single peak indicates a single user local to the device 110, whereas multiple peaks indicates multiple users local to the device 110). However, when the device 110 determines that far-end speech is present in the microphone audio data 602, the double-talk detection component 130 may distinguish between far-end single-talk conditions (e.g., a single peak represented in the LMS filter coefficient data) and double-talk conditions (e.g., two or more peaks represented in the LMS filter coefficient data).

In some examples, the double-talk detection component 130 may generate decision data 650 that indicates current system conditions (e.g., near-end single-talk conditions, far-end single-talk conditions, or double-talk conditions). Thus, the double-talk detection component 130 may indicate the current system conditions to the ARA target beam selection component 630, the ARA reference beam selection component 640, the AIC component 120, and/or additional components of the device 110. However, the disclosure is not limited thereto and the double-talk detection component 130 may generate decision data 650 indicating additional information without departing from the disclosure.

In some examples, the decision data 650 may include location data indicating a location (e.g., direction relative to the device 110) associated with each of the peaks represented in the LMS filter coefficient data. For example, individual filter coefficients of the LMS adaptive filter may correspond to a time difference of arrival of the audible sound, enabling the device 110 to determine the direction of an audio source relative to the device 110. Thus, the double-talk detection component 130 may generate decision data 650 that indicates the current system conditions, a number of peak(s) represented in the LMS filter coefficient data, and/or the location(s) of the peak(s), and may send the decision data 650 to the ARA target beam selection component 630, the ARA reference beam selection component 640, the AIC component 120, and/or additional components of the device 110.

To illustrate a first example, when the device 110 determines that far-end speech is not present, the double-talk detection component 130 may generate decision data 650 indicating that near-end single-talk conditions are present along with direction(s) associated with local speech generated by one or more local users. For example, if the double-talk detection component 130 determines that only a single peak is represented during a first duration of time, the double-talk detection component 130 may determine a first direction associated with a first user during the first duration of time. However, if the double-talk detection component 130 determines that two peaks are represented during a second duration of time, the double-talk detection component 130 may determine the first direction associated with the first user and a second direction associated with a second user. In addition, the double-talk detection component 130 may track the users over time and/or associate a particular direction with a particular user based on previous local speech during near-end single-talk conditions.

To illustrate a second example, when the device 110 determines that far-end speech is present, the double-talk detection component 130 may generate decision data 650 indicating system conditions (e.g., far-end single talk conditions or double-talk conditions), along with a number of peak(s) represented in the LMS filter coefficient data and/or location(s) associated with the peak(s). For example, if the double-talk detection component 130 determines that only a single peak is represented in the LMS filter coefficient data during a third duration of time, the double-talk detection component 130 may generate decision data 650 indicating that far-end single-talk conditions are present and identifying a third direction associated with the loudspeaker 114 outputting the far-end speech during the third duration of time. However, if the double-talk detection component 130 determines that two or more peaks are represented in the LMS filter coefficient data during a fourth duration of time, the double-talk detection component 130 may generate decision data 650 indicating that double-talk conditions are present, identifying the third direction associated with the loudspeaker 114, and identifying a fourth direction associated with a local user. In addition, the double-talk detection component 130 may track the loudspeaker 114 over time and/or associate a particular direction with the loudspeaker 114 based on previous far-end single-talk conditions.

As the double-talk detection component 130 may track first direction(s) associated with local users during near-end single-talk conditions and second direction(s) associated with the loudspeaker(s) 114 during far-end single-talk conditions, the double-talk detection component 130 may determine whether double-talk conditions are present in part based on the locations of peaks represented in the LMS filter coefficient data. For example, the double-talk detection component 130 may determine that two peaks are represented in the LMS filter coefficient data but that both locations were previously associated with local users during near-end single-talk conditions. Therefore, the double-talk detection component 130 may determine that near-end single-talk conditions are present. Additionally or alternatively, the double-talk detection component 130 may determine that two peaks are represented in the LMS filter coefficient data but that one location was previously associated with the loudspeaker 114 during far-end single-talk conditions. Therefore, the double-talk detection component 130 may determine that double-talk conditions are present In some examples, the ARA target beam selection component 630 may select the target beam(s) based on location data (e.g., location(s) associated with near-end speech, such as a local user) included in the detection data 650 received from the double-talk detection component 130. However, the disclosure is not limited thereto and the ARA target beam selection component 630 may select the target beam(s) using techniques known to one of skill in the art without departing from the disclosure. For example, the ARA target beam selection component 630 may detect local speech represented in the beamformed audio data, may track a direction associated with a user (e.g., identify direction(s) associated with near-end single-talk conditions), may determine the direction associated with the user using facial recognition, and/or the like without departing from the disclosure.

In some examples, the ARA reference beam selection component 640 may select the reference beam(s) based on location data (e.g., location(s) associated with far-end speech, such as the loudspeaker(s) 114 outputting the far-end speech) included in the detection data 650 received from the double-talk detection component 130. However, the disclosure is not limited thereto and the ARA reference beam selection component 640 may select the reference beam(s) using techniques known to one of skill in the art without departing from the disclosure. For example, the ARA reference beam selection component 640 may detect remote speech represented in the beamformed audio data, may track a direction associated with a loudspeaker 114 (e.g., identify direction(s) associated with far-end single-talk conditions), may determine the direction associated with the loudspeaker(s) 114 using computer vision processing, and/or the like without departing from the disclosure.

In order to avoid selecting an output of the loudspeaker(s) 114 as a target signal, the ARA target beam selection component 630 may dynamically select the target beam(s) only during near-end single-talk conditions. Thus, the ARA target beam selection component 630 may freeze target beam selection and store the currently selected target beam(s) when the device 110 determines that far-end single-talk conditions and/or double-talk conditions are present (e.g., the device 110 detects far-end speech). For example, if the ARA target beam selection component 630 selects a first direction (e.g., Direction 1) as the target beam during near-end single-talk conditions, the ARA target beam selection component 630 may store the first direction as the target beam during far-end single-talk conditions and/or double-talk conditions, such that the target signal(s) correspond to beamformed audio data associated with the first direction. Thus, the target beam(s) remain fixed (e.g., associated with the first direction) whether the target signal(s) represent local speech (e.g., during double-talk conditions) or not (e.g., during far-end single-talk conditions).

Similarly, in order to avoid selecting the local speech as a reference signal, the ARA reference beam selection component 640 may select the reference beam(s) only during far-end single-talk conditions. Thus, the ARA reference beam selection component 640 may freeze reference beam selection and store the currently selected reference beam(s) when the device 110 determines that near-end single-talk conditions and/or double-talk conditions are present (e.g., the device 110 detects near-end speech). For example, if the ARA reference beam selection component 640 selects a fifth direction (e.g., Direction 5) as the reference beam during far-end single-talk conditions, the ARA reference beam selection component 640 may store the fifth direction as the reference beam during near-end single-talk conditions and/or double-talk conditions, such that the reference signal(s)

correspond to beamformed audio data associated with the fifth direction. Thus, the reference beam(s) remain fixed (e.g., associated with the fifth direction) whether the reference signal(s) represent remote speech (e.g., during double-talk conditions) or not (e.g., during near-end single-talk conditions).

To illustrate an example, in response to the device 110 determining that near-end single-talk conditions are present, the ARA reference beam selection component 640 may store previously selected reference beam(s) and the ARA target beam selection component 630 may dynamically select target beam(s) using the beamformed audio data output by the FBF 620. While the near-end single-talk conditions are present, the AIC component 120 may generate an output signal 660 by subtracting reference signal(s) corresponding to the fixed reference beam(s) from target signal(s) corresponding to the dynamic target beam(s). If the device 110 determines that double-talk conditions are present, the ARA target beam selection component 630 may store the previously selected target beam(s) and the AIC component 120 may generate the output signal 660 by subtracting reference signal(s) corresponding to the fixed reference beam(s) from target signal(s) corresponding to the fixed target beam(s). Finally, if the device 110 determining that far-end single-talk conditions are present, the ARA reference beam selection component 640 may dynamically select reference beam(s) using the beamformed audio data output by the FBF 620. Thus, the far-end single-talk conditions are present, the AIC component 120 may generate the output signal 660 by subtracting reference signal(s) corresponding to the dynamic reference beam(s) from target signal(s) corresponding to the fixed target beam(s).

FIG. 6B illustrates an example of a detailed component diagram that includes additional components not illustrated in FIG. 6A. For example, in some examples the device 110 may include an external loudspeaker position learning component 670. As illustrated in FIG. 6B, the external loudspeaker position learning component 670 may receive inputs from the FBF 620 and/or the double-talk detector component 130 and may generate an output to the ARA reference beam selection component 640. For example, the external loudspeaker position learning component 670 may track the loudspeaker 114 over time and send this information to the ARA reference beam selection component 640. However, the disclosure is not limited thereto and the external loudspeaker position learning component 670 may be included as part of the ARA reference beam selection component 640 without departing from the disclosure.

While not illustrated in FIG. 6B, the device 110 may include a local user position learning component similar to the external loudspeaker position learning component 670 without departing from the disclosure. Additionally or alternatively, the local user position learning component may be included as part of the ARA target beam selection component 630 without departing from the disclosure.

The output of the AIC component 120 may be input to Residual Echo Suppression (RES) component 122, which may perform residual echo suppression processing to suppress echo signals (or undesired audio) remaining after echo cancellation. In some examples, the RES component 122 may only perform RES processing during far-end single-talk conditions, to ensure that the local speech is not suppressed or distorted during near-end single-talk conditions and/or double-talk conditions. However, the disclosure is not limited thereto and in other examples the RES component 122 may perform aggressive RES processing during far-end single-talk conditions and minor RES processing during double-talk conditions. Thus, the system conditions may dictate an amount of RES processing applied, without explicitly disabling the RES component 122. Additionally or alternatively, the RES component 122 may apply RES processing to high frequency bands using a first gain value (and/or first attenuation value), regardless of the system conditions, and may switch between applying the first gain value (e.g., greater suppression) to low frequency bands during far-end single-talk conditions and applying a second gain value (and/or second attenuation value) to the low frequency bands during near-end single-talk conditions and/or double-talk conditions. Thus, the system conditions control an amount of gain applied to the low frequency bands, which are commonly associated with speech.

After the RES component 122, the device 110 may apply noise reduction 680 to generate an output signal 690. In some examples, the device 110 may include adaptive gain control (AGC) (not illustrated) and/or dynamic range compression (DRC) (not illustrated) (which may also be referred to as dynamic range control) to generate output audio data in a sub-band domain. The device 110 may apply the noise reduction, the AGC, and/or the DRC using any techniques known to one of skill in the art. In addition, the device 110 may include a sub-band synthesis (not illustrated) to convert the output audio data from the sub-band domain to the time domain. For example, the output audio data in the sub-band domain may include a plurality of separate sub-bands (e.g., individual frequency bands) and the sub-band synthesis may correspond to a filter bank that combines the plurality of sub-bands to generate the output signal in the time domain.

As illustrated in FIG. 6B, the double-talk detection component 130 may generate decision data 650 that indicates the current system conditions, a number of peak(s) represented in the LMS filter coefficient data, and/or the location(s) of the peak(s), and may send the decision data 650 to the ARA target beam selection component 630, the ARA reference beam selection component 640, the AIC component 120, the RES component 122, the external loudspeaker position learning component 670, and/or additional components of the device 110.

FIG. 7 illustrates examples of determining system conditions according to examples of the present disclosure. As discussed above, the double-talk detection component 130 may receive the microphone audio data 602 and may include an LMS adaptive filter that performs AIC processing using a first microphone signal as a target signal and a second microphone signal as a reference signal. Based on the LMS filter coefficient data, the double-talk detection component 130 may determine current system conditions (e.g., near-end single-talk conditions, far-end single-talk conditions, or double-talk conditions). For example, the double-talk detection component 130 may distinguish between single-talk conditions and double-talk conditions based on a number of peaks represented in the LMS filter coefficient data. Thus, a single peak corresponds to single-talk conditions, whereas two or more peaks may correspond to double-talk conditions.

In some examples, the double-talk detection component 130 may receive additional input indicating whether far-end speech is present in the microphone audio data 602. When the device 110 determines that far-end speech is not present in the microphone audio data 602, the double-talk detection component 130 determines that near-end single-talk conditions are present, regardless of a number of peaks represented in the LMS filter coefficient data (e.g., a single peak indicates a single user local to the device 110, whereas multiple peaks indicates multiple users local to the device 110). However, when the device 110 determines that far-end speech is present in the microphone audio data 602, the double-talk detection component 130 may distinguish between far-end single-talk conditions (e.g., a single peak represented in the LMS filter coefficient data) and double-talk conditions (e.g., two or more peaks represented in the LMS filter coefficient data).

To illustrate different examples, FIG. 7 illustrates LMS filter coefficients corresponding to various system conditions. For example, during a first period of time the device 110 may determine that far-end speech is detected and the LMS adaptive filter may generate filter coefficients 720, which include a single peak located at a first location. Thus, the double-talk detection component 130 may determine that the first period of time corresponds to far-end single-talk conditions, as the far-end speech is present and only a single peak is represented in the filter coefficients 720, and that the loudspeaker 114 is associated with the first location (e.g., first direction corresponding to filter coefficients 16-17).

During a second period of time, the device 110 may determine that far-end speech is not present and the LMS adaptive filter may generate filter coefficients 730, which includes a single peak located at a second location. Thus, the double-talk detection component 130 may determine that the second period of time corresponds to near-end single-talk conditions, as the far-end speech is not present, with only a single local user (e.g., due to the single peak). In addition, the double-talk detection component 130 may determine that the local user is associated with the second location (e.g., second direction corresponding to filter coefficient 13).

During a third period of time, the device 110 may determine that far-end speech is detected again and the LMS adaptive filter may generate filter coefficients 740, which include a single peak located roughly at the first location. Thus, the double-talk detection component 130 may determine that the third period of time corresponds to far-end single-talk conditions, as the far-end speech is present and only a single peak is represented in the filter coefficients 740, and that the loudspeaker 114 is still associated with the first location (e.g., first direction corresponding to filter coefficients 16-17).

During a fourth period of time, the device 110 may determine that far-end speech is present and the LMS adaptive filter may generate filter coefficients 750, which include two peaks. Thus, the double-talk detection component 130 may determine that the fourth period of time corresponds to double-talk conditions, as the far-end speech is present and there are multiple peaks represented in the filter coefficients 750. In addition, the double-talk detection component 130 may determine that the loudspeaker 114 is still associated with the first location (e.g., first direction corresponding to filter coefficients 16-17) and that the local user is associated with the second location (e.g., second direction corresponding to filter coefficient 13).

Figure 8:
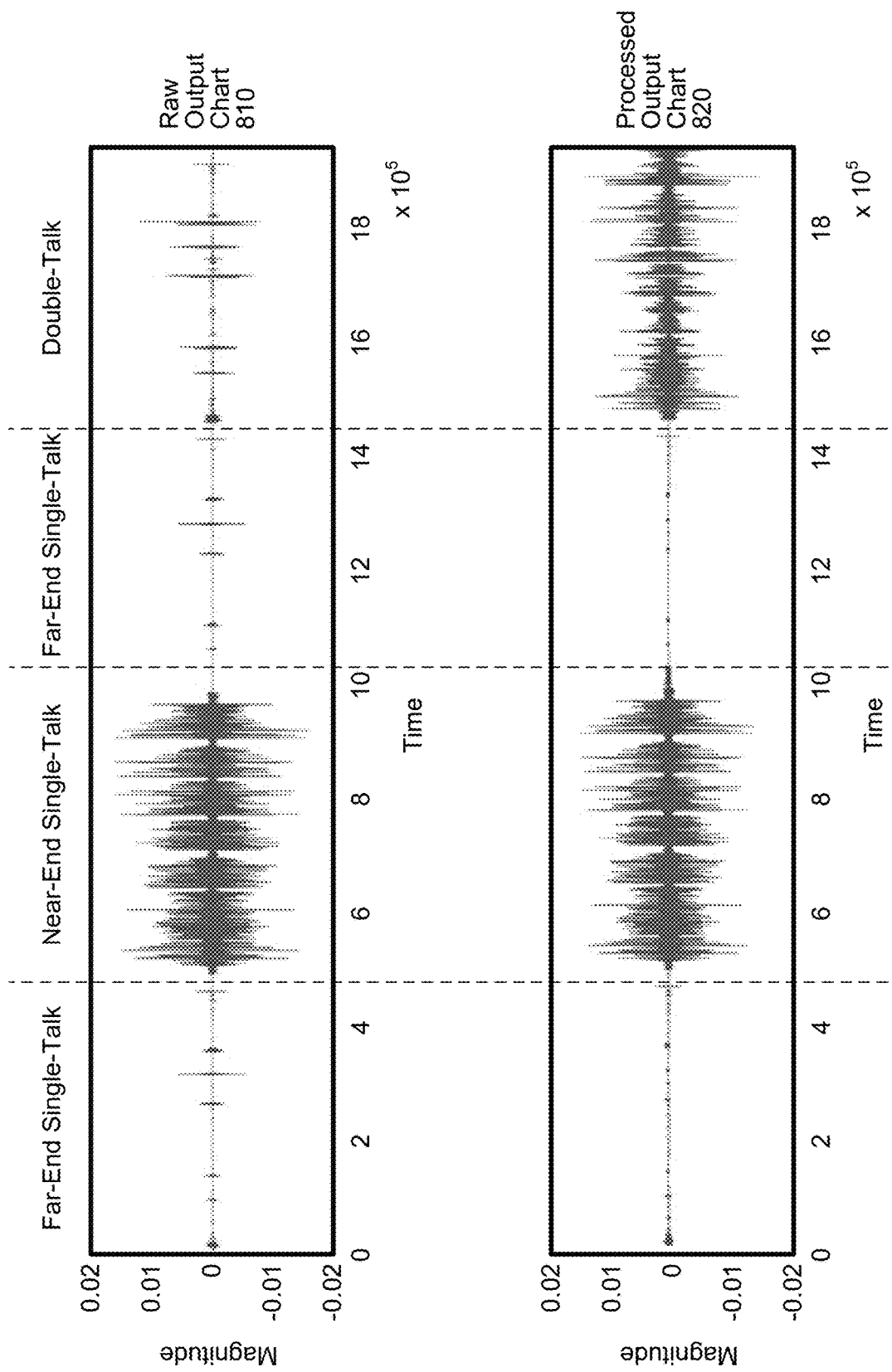
FIG. 8 illustrates examples of outputs generated using double-talk detection according to examples of the present disclosure.

FIG. 8 illustrates examples of outputs generated using double-talk detection according to examples of the present disclosure. As illustrated in FIG. 8, raw output chart 810 and processed output chart 820 correspond to the output audio chart 710 described above. For example, the raw output chart 810 and the processed output chart 820 include four separate sections, with the first period of time corresponding to far-end single-talk conditions, the second period of time corresponding to near-end single-talk conditions, the third period of time corresponding to far-end single-talk conditions, and the fourth period of time corresponding to double-talk conditions. As illustrated in FIG. 8, the raw output chart 810 and the processed output chart 820 are extremely similar during far-end single-talk conditions and near-end single-talk conditions, but the processed output chart 820 is noticeably different than the raw output chart 810 during double-talk conditions. For example, during the fourth period of time, the raw output chart 810 suppresses a large portion of the output audio data, which removes the echo signal as well the local speech. In contrast, during the fourth period of time the processed output chart 820 maintains the audio data captured by the microphone(s) 112, performing less AIC processing (e.g., due to freezing AIC filter coefficient adaptation and reference beam selection during double-talk conditions) and RES processing during the double-talk conditions.

FIGS. 9A-9B illustrate examples of determining system conditions according to examples of the present disclosure. As shown by decision chart 910 illustrated in FIG. 9A, the device 110 may determine system conditions based on a number of peaks represented in the LMS filter coefficient data. For example, if there are zero peaks represented in the LMS filter coefficient data, the device 110 may determine that silence is detected (e.g., no-speech conditions 220). In contrast, if there is one peak represented in the LMS filter coefficient data, the device 110 may determine that single-talk conditions are present. Finally, if there are two peaks represented in the LMS filter coefficient data, the device 110 may determine that double-talk conditions are present. As the device 110 may apply different parameters depending on whether far-end single-talk conditions are present or double-talk conditions are present, distinguishing between single-talk conditions and double-talk conditions improves the output audio data generated by the device 110.

In some examples, the double-talk detection component 130 may receive additional input indicating whether the far-end speech is present. For example, the device 110 may separately determine whether the far-end signal is active and/or whether far-end speech is present in the microphone audio data using various techniques known to one of skill in the art. As illustrated in FIG. 9B, this additional information is illustrated as additional context data 922, which indicates either "no far-end speech" (e.g., far-end speech is not present in the microphone audio data) or "far-end speech" (e.g., far-end speech is present in the microphone audio data). In addition, FIG. 9B illustrates decision chart 920, which represents potential system conditions based on the additional context data 922 and the number of peak(s) detected in the LMS filter coefficient data.

Regardless of whether far-end speech is present or not, no peaks represented in the LMS filter coefficient data corresponds to silence being detected (e.g., no-speech conditions 220). Additionally or alternatively, the device 110 may perform voice activity detection (VAD) and/or include a VAD detector to determine that no-speech conditions 220 are present (e.g., speech silence) without departing from the disclosure.

When the device 110 determines that far-end speech is not present, the double-talk detection component 130 may generate decision data indicating that near-end single-talk conditions are present along with direction(s) associated with local speech generated by one or more local users. For example, if the double-talk detection component 130 determines that only a single peak is represented in the LMS filter coefficient data, the double-talk detection component 130 may determine a first direction associated with a first user. However, if the double-talk detection component 130 determines that two peaks are represented in the LMS filter coefficient data, the double-talk detection component 130 may determine the first direction associated with the first user and a second direction associated with a second user. In addition, the double-talk detection component 130 may track the users over time and/or associate a particular direction with a particular user based on previous local speech during near-end single-talk conditions.

When the device 110 determines that far-end speech is present, the double-talk detection component 130 may generate decision data indicating system conditions (e.g., far-end single talk conditions or double-talk conditions), along with a number of peak(s) represented in the LMS filter coefficient data and/or location(s) associated with the peak(s). For example, if the double-talk detection component 130 determines that only a single peak is represented in the LMS filter coefficient data, the double-talk detection component 130 may generate decision data indicating that far-end single-talk conditions are present and identifying a third direction associated with the loudspeaker 114 outputting the far-end speech. However, if the double-talk detection component 130 determines that two or more peaks are represented in the LMS filter coefficient data, the double-talk detection component 130 may generate decision data indicating that double-talk conditions are present, identifying the third direction associated with the loudspeaker 114, and identifying a fourth direction associated with a local user (e.g., the first direction associated with the first user, the second direction associated with the second user, or a new direction associated with an unidentified user). In addition, the double-talk detection component 130 may track the loudspeaker 114 over time and/or associate a particular direction with the loudspeaker 114 based on previous far-end single-talk conditions.

Thus, the double-talk detection component 130 may generate decision data that indicates the current system conditions, a number of peak(s) represented in the LMS filter coefficient data, and/or the location(s) of the peak(s). If the double-talk detection component 130 determines that near-end single-talk conditions are present, the number of peak(s) correspond to the number of local users generating local speech and the location(s) of the peak(s) correspond to individual locations for each local user speaking. Additionally or alternatively, if the double-talk detection component 130 determines that far-end single-talk conditions are present, the number of peak(s) correspond to the number of loudspeaker(s) 114 (typically only one, although the disclosure is not limited thereto) outputting the far-end speech and the location(s) of the peak(s) correspond to individual locations for each loudspeaker 114. Finally, if the double-talk detection component 130 determines that double-talk conditions are present, the number of peaks correspond to a sum of a first number of local users generating local speech and a second number of loudspeaker(s) 114 outputting the far-end speech, and the location(s) of the peak(s) correspond to individual locations for each of the local users and/or loudspeaker 114.

As the double-talk detection component 130 tracks the location of the local users and/or the loudspeaker(s) 114 over time, the double-talk detection component 130 may associate individual peaks with a likely source (e.g., first peak centered on filter coefficient 13 corresponds to a local user, while second peak centered on filter coefficients 16-17 correspond to the loudspeaker 114, etc.).

In some examples, the device 110 may output the far-end reference signal x(t) only to a single loudspeaker 114. Thus, the device 110 may determine when double-talk conditions are present whenever the far-end speech is detected and two or more peaks are represented in the LMS filter coefficient data. By tracking a location of the loudspeaker 114 during far-end single-talk conditions, the device 110 may identify location(s) of one or more user(s) during the double-talk conditions. However, the disclosure is not limited thereto and in other examples, the device 110 may output the far-end reference signal x(t) to two or more loudspeakers 114. For example, if the device 110 outputs the far-end reference signal x(t) to two loudspeakers 114, the device 110 may determine when double-talk conditions are present whenever the far-end speech is detected and three or more peaks are represented in the LMS filter coefficient data. By tracking a location of the loudspeakers 114 during the far-end single-talk conditions, the device 110 may identify location(s) of one or more user(s) during the double-talk conditions.

Figure 10A:
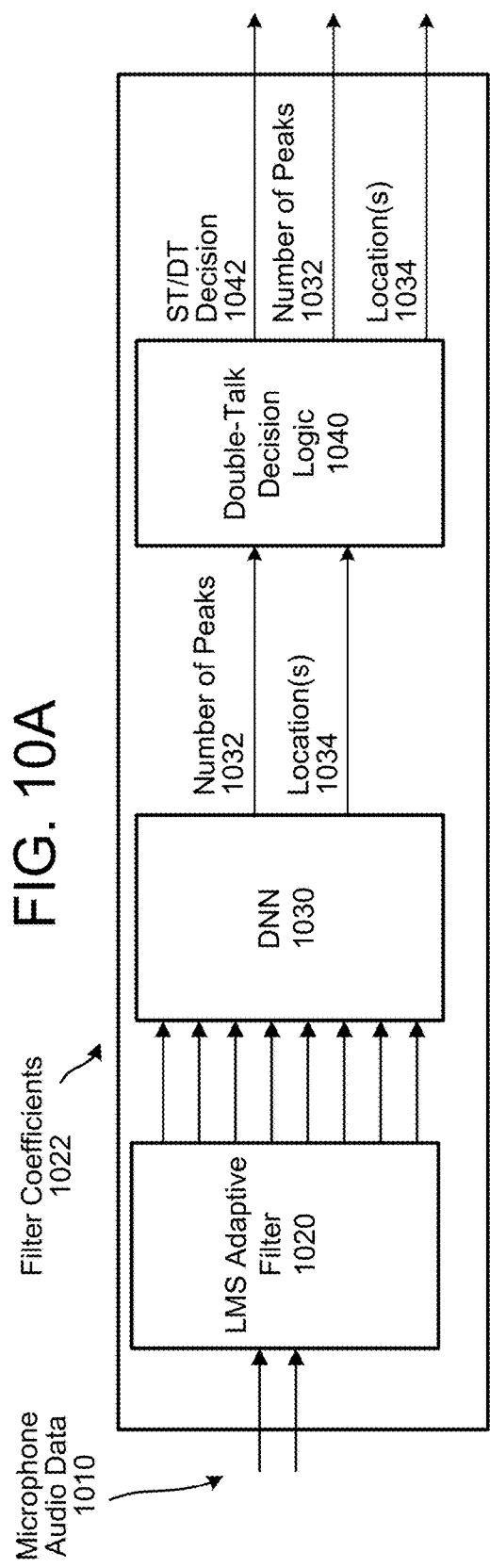
FIGS. 10A-10B illustrate examples of performing double-talk detection using a deep neural network according to examples of the present disclosure.
Figure 10B:
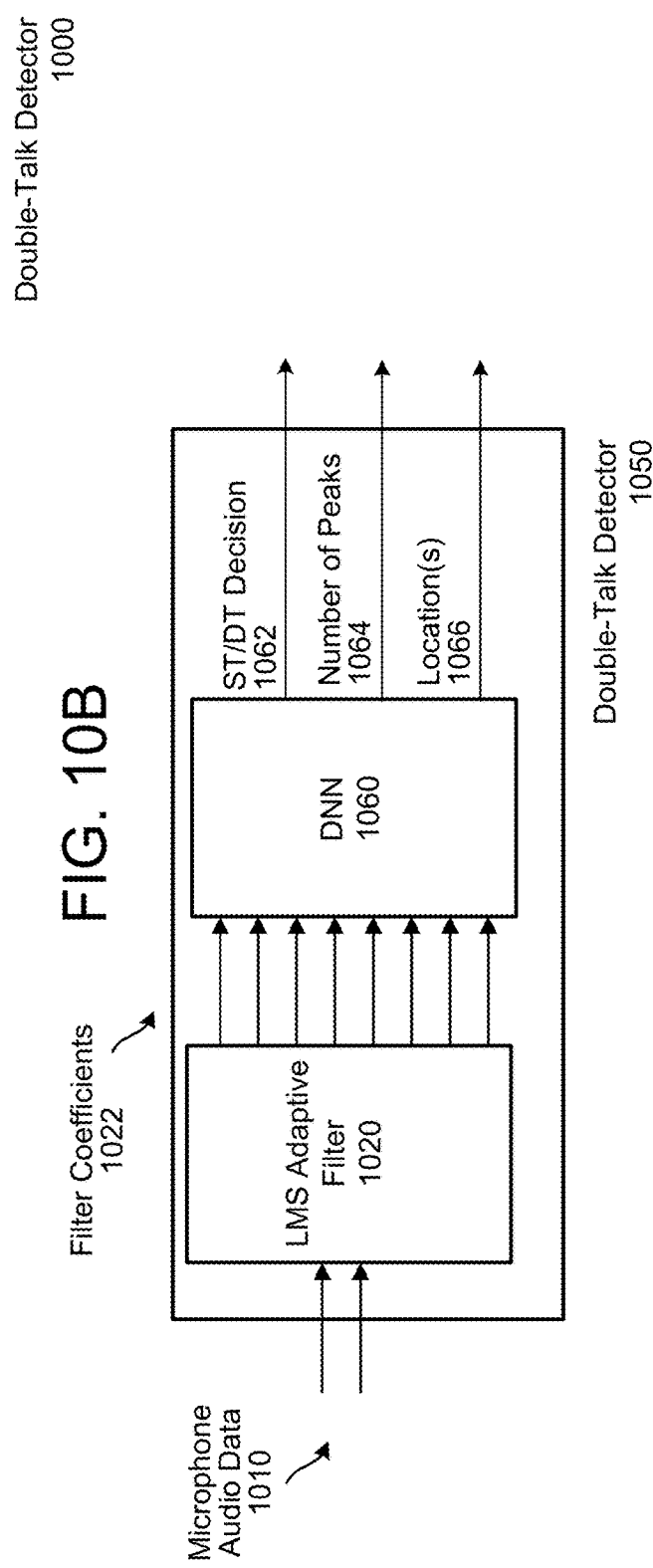

FIGS. 10A-10B illustrate examples of performing double-talk detection using a deep neural network according to examples of the present disclosure. As illustrated in FIG. 10A, in some examples a double-talk detector 1000 may include a deep neural network (DNN) configured to determine a number of peak(s) represented in the LMS filter coefficient data and/or location(s) of the peak(s). For example, the double-talk detector 1000 may receive microphone audio data 1010 and may input the microphone audio data 1010 to an LMS adaptive filter 1020. The LMS adaptive filter 1020 may use a first microphone input as a target signal and a second microphone input as a reference signal and may perform AIC processing to subtract the reference signal from the target signal. As part of performing AIC processing, the LMS adaptive filter 1020 may adapt filter coefficient values (e.g., filter coefficients 1022) to minimize an output of the LMS adaptive filter 1020. While not illustrated in FIG. 10A, the double-talk detector 1000 may include a voice activity detection (VAD) detector to detect speech in the microphone audio data 1010. Thus, the LMS adaptive filter 1020 may only adapt the filter coefficients 1022 when speech is present.

The LMS adaptive filter 1020 may output the filter coefficients 1022 to a DNN 1030. The DNN 1030 may analyze the filter coefficients 1022 and determine a number of peaks 1032 and location(s) 1034 of the peaks and output this information to double-talk decision logic 1040. The double-talk decision logic 1040 may analyze the number of peaks 1032 and the location(s) 1034 of the peaks and generate single-talk/double-talk (ST/DT) decision 1042. The double-talk detector 1000 may then output the ST/DT decision 1042, the number of peaks 1032, and/or the location(s) 1034. In some examples, the double-talk detector 1000 may only output the ST/DT decision 1042, although the disclosure is not limited thereto.

Additionally or alternatively, the double-talk detector 1000 may output unique information to different components of the device 110. For example, during near-end single-talk conditions the double-talk detector 1000 may output the ST/DT decision 1042 to the ARA reference beam selection component 640 but may output the ST/DT decision 1042, the number of peaks 1032 and the location(s) 1034 of the peaks to the ARA target beam selection component 630. Similarly, during far-end single-talk conditions the double-talk detector 1000 may output the ST/DT decision 1042 to the ARA target beam selection component 630 but may output the ST/DT decision 1042, the number of peaks 1032 and the location(s) 1034 of the peaks to the ARA reference beam selection component 640. During double-talk conditions, the double-talk detector 1000 may output the ST/DT decision 1042 and a first location of a first peak to the ARA target beam selection component 630 and may output the ST/DT decision 1042 and a second location of a second peak to the ARA reference beam selection component 640.

While FIG. 10A illustrates the DNN 1030 outputting the number of peaks 1032 and the location(s) 1034 of the peaks to the double-talk decision logic 1040, the disclosure is not limited thereto and a DNN may determine the ST/DT decision as well. As illustrated in FIG. XFB, a DNN 1060 may receive the filter coefficients 1022 and may determine an ST/DT decision 1062, a number of peaks 1064, and/or location(s) 1066 of the peaks. Thus, the DNN 1060 may combine the functionality of the DNN 1030 and the double-talk decision logic 1040 without departing from the disclosure.

Various machine learning techniques may be used to train and operate models to perform various steps described above, such as user recognition feature extraction, encoding, user recognition scoring, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11B:
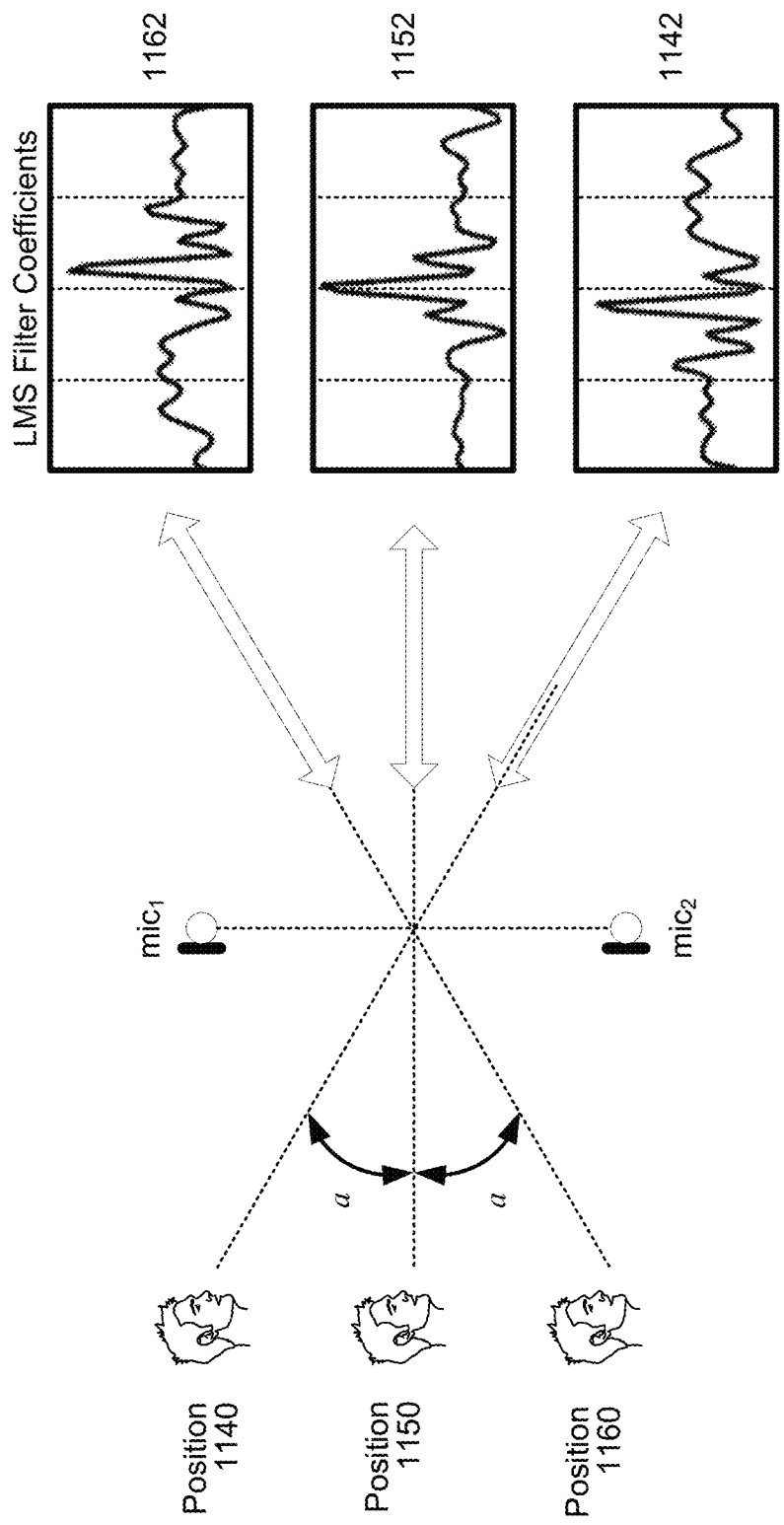

FIGS. 11A-11C illustrate examples of performing double-talk detection using filter coefficients according to examples of the present disclosure. As illustrated in FIG. 11A, a number of different filter coefficient values may be used to determine a location of an audio source, whether it is a loudspeaker 114 or a local user. For example, weight chart 1110 illustrates LMS filter coefficient data during far-end single-talk conditions, with a horizontal axis corresponding to a unique filter coefficient (e.g., 32 unique filter coefficients used in the LMS adaptive filter) and a vertical axis indicating a weight value associated with the filter coefficient. Thus, a set of 32 weights corresponds to a single processing frame and is represented by a line in the weight chart 1110. While the device 110 may detect the peak 1112 using a single set of weights, the weight chart 1110 illustrates a plurality of lines (e.g., multiple sets of weights), and the device 110 may detect the peak 1112 using multiple sets of weights to improve an accuracy and avoid detecting transitory noises that do not correspond to speech (e.g., short term audio sources). Thus, the device 110 may make a double-talk decision every processing frame, but the decision may be based on multiple processing frames as the device 110 may factor in previous processing frames.

While weight chart 1110 represents far-end single-talk conditions, weight chart 1120 represents near-end single-talk conditions. As illustrated in FIG. 11A, the first peak 1112 corresponding to far-end single-talk conditions is located at a first location (e.g., roughly filter coefficient 16), whereas a second peak 1122 corresponding to near-end single-talk conditions is located at a second location (e.g., roughly filter coefficient 12). FIG. 11A also illustrates double-talk conditions, which is represented by weight chart 1130 that includes a first peak 1132a and a second peak 1132b. In some examples, the device 110 may store previous locations associated with peaks represented in the LMS filter coefficient data, such that the device 110 may identify that the first peak 1132a corresponds to near-end speech and that the second peak 1132b corresponds to far-end speech. For example, the device 110 may determine that the first peak 1132a is at the second location (e.g., filter coefficient 12) that was associated with near-end single-talk conditions in weight chart 1120, whereas the second peak 1132b is at the first location (e.g., filter coefficient 16) that was associated with far-end single-talk conditions in weight chart 1110.

The relationship between user location and peak location is illustrated in FIG. 11B. For example, when the user is speaking at a first position 1140, the LMS filter coefficient data is represented by LMS filter coefficients 1142 having a first peak location. Similarly, when the user is speaking at a second position 1150, the LMS filter coefficient data is represented by LMS filter coefficients 1152 having a second peak location. Finally, when the user is speaking at a third position 1160, the LMS filter coefficient data is represented by LMS filter coefficients 1162 having a third peak location. Thus, the peak location varies between the first peak location and the third peak location as the user moves between the first position 1140 and the third position 1160. Thus, the device 110 may use the LMS filter coefficients to determine a direction associated with any source of audible noise, including the user, the loudspeaker 114, and/or other sources of noise.

As illustrated in the weight charts illustrated in FIG. 11A, the LMS filter coefficient data may exhibit minor variations and fluctuations, with local minima and maxima throughout. Thus, the device 110 may identify a number of peaks and may perform additional processing to identify significant peaks that are associated with an audible sound. For example, the weight chart 1122 includes a strong peak 1122 (e.g., peak centered on filter coefficient 12) that corresponds to local speech generated by the user 10, as well as minor peaks (e.g., peaks centered on filter coefficients 5, 15, 16, and 18). To determine that near-end single-talk conditions are present (e.g., double-talk conditions are not present), the device 110 may distinguish the peak 1122 from the minor peaks by determining that the peak 1122 satisfies a condition (e.g., exceeds a threshold value, a ratio value, and/or the like), whereas the minor peaks do not.

Similarly, weight chart 1130 includes a first peak 1132a (e.g., peak centered on filter coefficient 12) that corresponds to the local speech generated by the user 10 and a second peak 1132b (e.g., peak centered on filter coefficients 15-16) that corresponds to the loudspeaker 114, as well as minor peaks (e.g., peaks centered on filter coefficients 5, 7, and 18). To determine that double-talk conditions are present (e.g., single-talk conditions are not present), the device 110 may distinguish the peaks 1132 from the minor peaks by determining that both the peak 1132*a* and the second peak 1132*b* satisfy the condition (e.g., exceeds a threshold value, a ratio value, and/or the like), whereas the minor peaks do not.

For example, the first peak 1132*a* clearly separates from the noise floor (e.g., average weight value), has the highest weight value (0.7) in the weight chart 1130, and a ratio of the peak value to the noise floor (e.g., 0.7/0.2=3.5) is significant, suggesting that the first peak 1132*a* clearly corresponds to an audio source (e.g., source of audible noise). However, while the second peak 1132*b* is separated from the noise floor (e.g., peak value 0.5), the ratio of the peak value to the noise floor is slightly lower (e.g., 0.5/0.2=2.5) and the second peak 1132*b* is only slightly higher than a third highest peak (e.g., peak value of roughly 0.35, centered on filter coefficient 18). Thus, based on how the device 110 determines the condition, the device 110 may select only the first peak 1132*a* as corresponding to an audio source, may select the first peak 1132*a* and the second peak 1132*b* as corresponding to an audio source, and/or may select the first peak 1132*a*, the second peak 1132*b*, and the third peak as corresponding to an audio source.

FIG. 11C illustrates examples of determining the condition and/or identifying significant peaks in the LMS filter coefficient data. As illustrated in FIG. 11C, filter coefficient chart 1170 includes a first peak 1172*a*, a second peak 1172*b*, and a third peak 1172*c*. The device 110 may determine a maximum value 1174, which is associated with the first peak 1172*a*, and may determine a threshold value 1176 based on the maximum value 1174. Thus, in this example, the device 110 may determine that the first peak 1172*a* corresponds to an audio source but that the second peak 1172*b* and the third peak 1172*c* do not.

Similarly, filter coefficient chart 1180 includes a first peak 1182*a*, a second peak 1182*b*, and a third peak 1182*c*. The device 110 may determine a maximum value 1184, which is associated with the second peak 1182*b*, and may determine a threshold value 1186 based on the maximum value 1184. Thus, in this example, the device 110 may determine that the first peak 1182*a*, the second peak 1182*b*, and the third peak 1182*c* correspond to an audio source as all three exceed the threshold value 1186.

Finally, filter coefficient chart 1190 includes a first peak 1192*a*, a second peak 1192*b*, and a third peak 1192*c*. The device 110 may determine a maximum value 1194, which is associated with the second peak 1192*b*, and may determine a threshold value 1196 based on the maximum value 1194. Thus, in this example, the device 110 may determine that the second peak 1182*b* and the third peak 1182*c* correspond to an audio source, as both peaks exceed the threshold value 1186, but that the first peak 1192*a* does not correspond to an audio source.

While the examples illustrated in FIG. 11C compare peaks to a threshold value 1176/1186/1196 to satisfy a condition, the disclosure is not limited thereto and the device 110 may use other conditions to determine significant peaks in the LMS filter coefficient data.

Additionally or alternatively, while the threshold values 1176/1186/1196 in the examples illustrated in FIG. 11C are based on the maximum values 1174/1184/1194, the disclosure is not limited thereto and the device 110 may determine the threshold values 1176/1186/1196 using other techniques known to one of skill in the art. For example, the threshold values 1176/1186/1196 may be a universal threshold (e.g., fixed threshold value regardless of the maximum value), may be based on the noise floor (e.g., 200% of the noise floor or the like), and/or the like without departing from the disclosure. For example, device 110 may determine a ratio between a peak value to an average value (e.g., peak over average ratio), compare peak to peak (e.g., magnitude of a first peak divided by a magnitude of a second peak, such as Peak1/Peak2), peak to group (e.g., magnitude of a first peak divided by an average magnitude of a group of peaks, such as Peak1/PeakGroup), group to everything else (e.g., average magnitude of a group of peaks divided by an average magnitude for all other data points, such as PeakGroup/EverythingElse), and/or the like.

Figure 12:
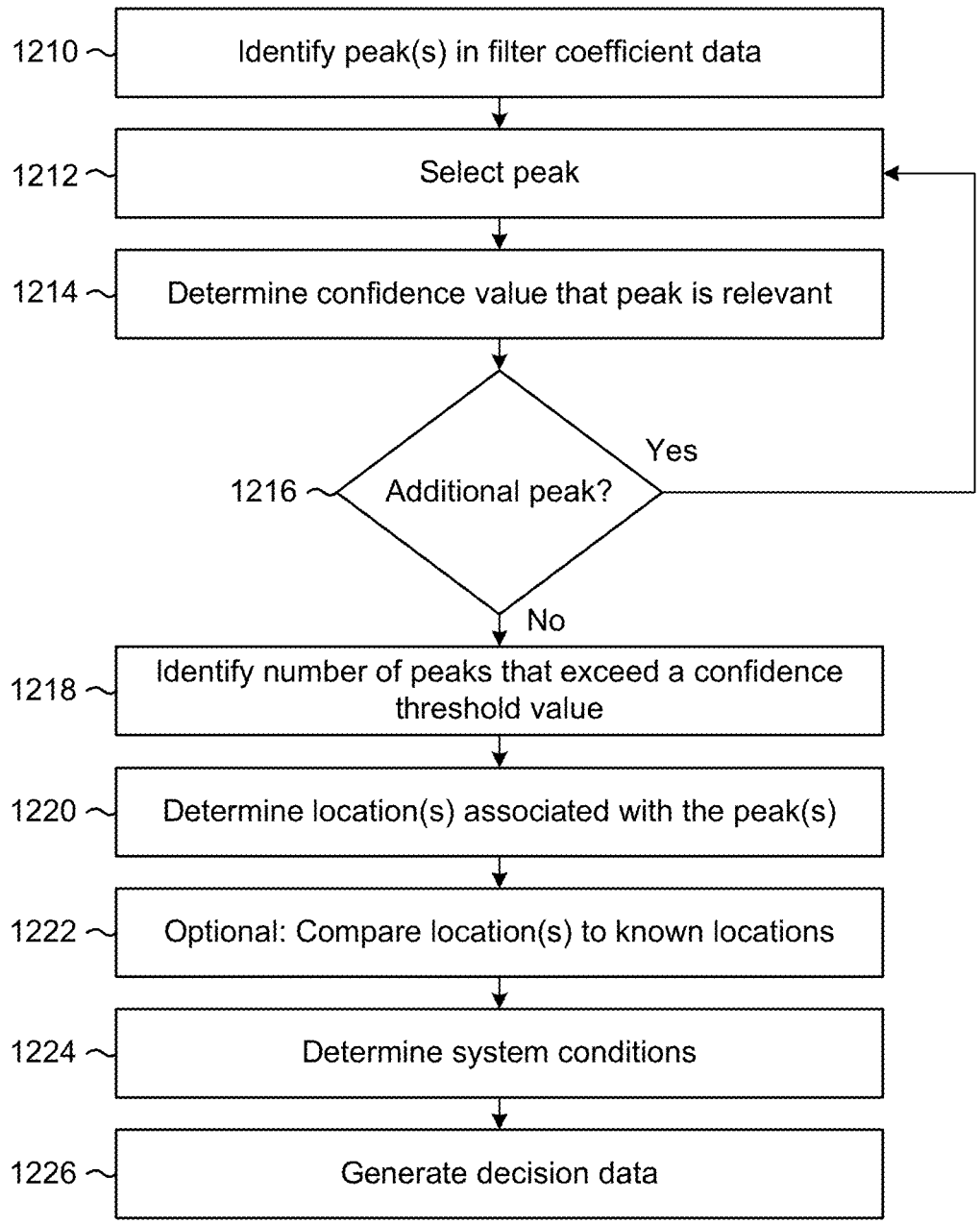
FIG. 12 is a flowchart conceptually illustrating an example method for performing double-talk detection according to embodiments of the present disclosure.

FIG. 12 is a flowchart conceptually illustrating an example method for performing double-talk detection according to embodiments of the present disclosure. As illustrated in FIG. 12, the device 110 may identify (1210) peak(s) in the filter coefficient data, may select (1212) a peak, and may determine (1214) a confidence value that the peak is relevant (e.g., satisfies a condition, exceeds a threshold value, etc.). The device 110 may determine (1216) whether there is an additional peak in the filter coefficient data, and if so may loop to step 1212 and repeat steps 1212-1216.

If the device 110 determines that there are no additional peaks in step 1216, the device 110 may identify (1218) a number of peaks that exceed a confidence threshold value (e.g., determine the number of peaks that have a confidence value above the confidence threshold value, indicating that the peaks are relevant), and may determine (1220) location(s) associated with the peak(s). The device 110 may optionally compare (1222) the location(s) to known locations associated with audio sources (e.g., previously identified locations), may determine (1224) system conditions, and may generate (1226) decision data. For example, the device 110 may determine that two peaks are relevant but that both peaks correspond to locations associated with local speech detected during previous near-end single-talk conditions, in which case near-end single-talk conditions are present. Alternatively, the device 110 may determine that two peaks are relevant but that one peak corresponds to a first location associated with local speech detected during previous near-end single-talk conditions and the other peak corresponds to a second location associated with the loudspeaker 114 detected during previous far-end single-talk conditions, in which case double-talk conditions are present.

Using only a single pair of two microphones, the device 110 may only determine a direction associated with an audio source using 180 degrees, as the time difference of arrival is equal for two opposite directions relative to the device. To illustrate an example, assuming that a microphone pair is oriented vertically (e.g., a first microphone is at 0 degrees and a second microphone is at 180 degrees), the device 110 can determine a specific direction associated with the audio source between 0 and 180 degrees, but the device 110 cannot distinguish between left and right. For example, a first time difference of arrival associated with 10 degrees is very different from a second time difference of arrival associated with 30 degrees, or a third time difference of arrival associated with 170 degrees, and the device 110 may determine that a first direction of arrival is 10 degrees, a second direction of arrival is 30 degrees, and a third direction of arrival is 170 degrees. However, the first time difference of arrival associated with 10 degrees (e.g., 10 degrees to the right) is identical to a fourth time difference of arrival associated with 350 degrees (e.g., 10 degrees to the left). Thus, the device 110 may determine that the first direction of arrival is 10 degrees regardless of whether the audio source is positioned at 10 degrees or 350 degrees relative to the device 110. Similarly, the third time difference of arrival associated with 170 degrees (e.g., 170 degrees to the right) is identical to a fifth time difference of arrival associated with 190 degrees (e.g., 170 degrees to the left). Thus, the device 110 may determine that the third direction of arrival is 170 degrees regardless of whether the audio source is positioned at 170 degrees or 190 degrees relative to the device 110.

To improve location estimation, the device 110 may use two pairs of microphones and interpret the results to increase precision to 360 degrees. For example, if an orientation of the second pair of microphones is offset from an orientation of the first pair of microphones by 90 degrees, the device 110 may distinguish between left and right. To illustrate an example, assuming that the first microphone pair is oriented vertically (e.g., a first microphone is at 0 degrees and a second microphone is at 180 degrees), and the second microphone pair is oriented horizontally (e.g., a third microphone is at 270 degrees and a fourth microphone is at 90 degrees), the device 110 may use the first pair of microphones to distinguish between top and bottom and may use the second pair of microphones to distinguish between left and right.

While the examples described herein refer to two pairs of discrete microphones (e.g., four total microphones), the disclosure is not limited thereto and the device 110 may improve location estimation using only three microphones (e.g., the first pair includes the first microphone and the second microphone in a vertical implementation, the second pair includes the first microphone and the third microphone in a horizontal implementation) without departing from the disclosure.

Figure 13:
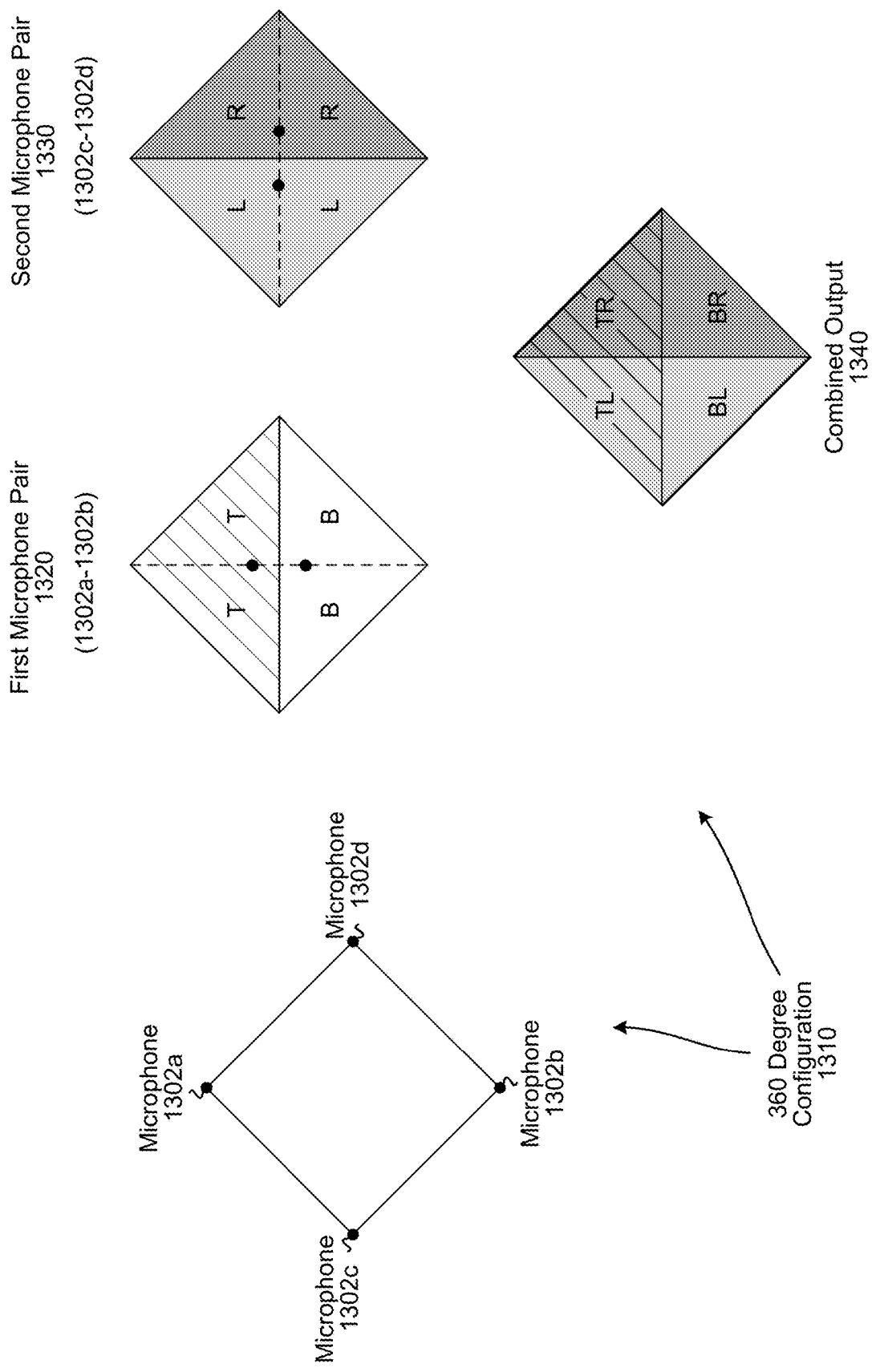
FIG. 13 illustrates an example of using two pairs of microphones to improve location estimation according to embodiments of the present disclosure.

FIG. 13 illustrates an example of using two pairs of microphones to improve location estimation according to embodiments of the present disclosure. As illustrated in FIG. 13, a 360 degree configuration 1310 may include four microphones 1302a-1302d, with a first microphone pair 1320 (e.g., first microphone 1302a and second microphone 1302b) in a vertical orientation and a second microphone pair 1330 (e.g., third microphone 1302c and fourth microphone 1302d) in a horizontal orientation. Thus, the first microphone pair 1320 may distinguish between 180 degrees in a vertical direction, which is represented by hashing a top half (e.g., top T) differently than a bottom half (e.g., bottom B), while the second microphone pair 1330 may distinguish between 180 degrees in a horizontal direction, which is represented by shading a left half (e.g., left L) differently than a right half (e.g., right R).

As illustrated in FIG. 13, the first microphone pair 1320 does not distinguish between left (L) and right (R), whereas the second microphone pair 1330 does not distinguish between top (T) and bottom (B). However, the device 110 may use the first microphone pair 1320 in combination with the second microphone pair 1330 to generate combined output 1340, which may distinguish between a top left (TL), a top right (TR), a bottom left (BR), and a bottom right (BR). Thus, using both pairs of microphones, the device 110 may determine a direction of arrival associated with an audio source (and therefore a direction relative to the device 110) using 360 degrees.

Figure 14:
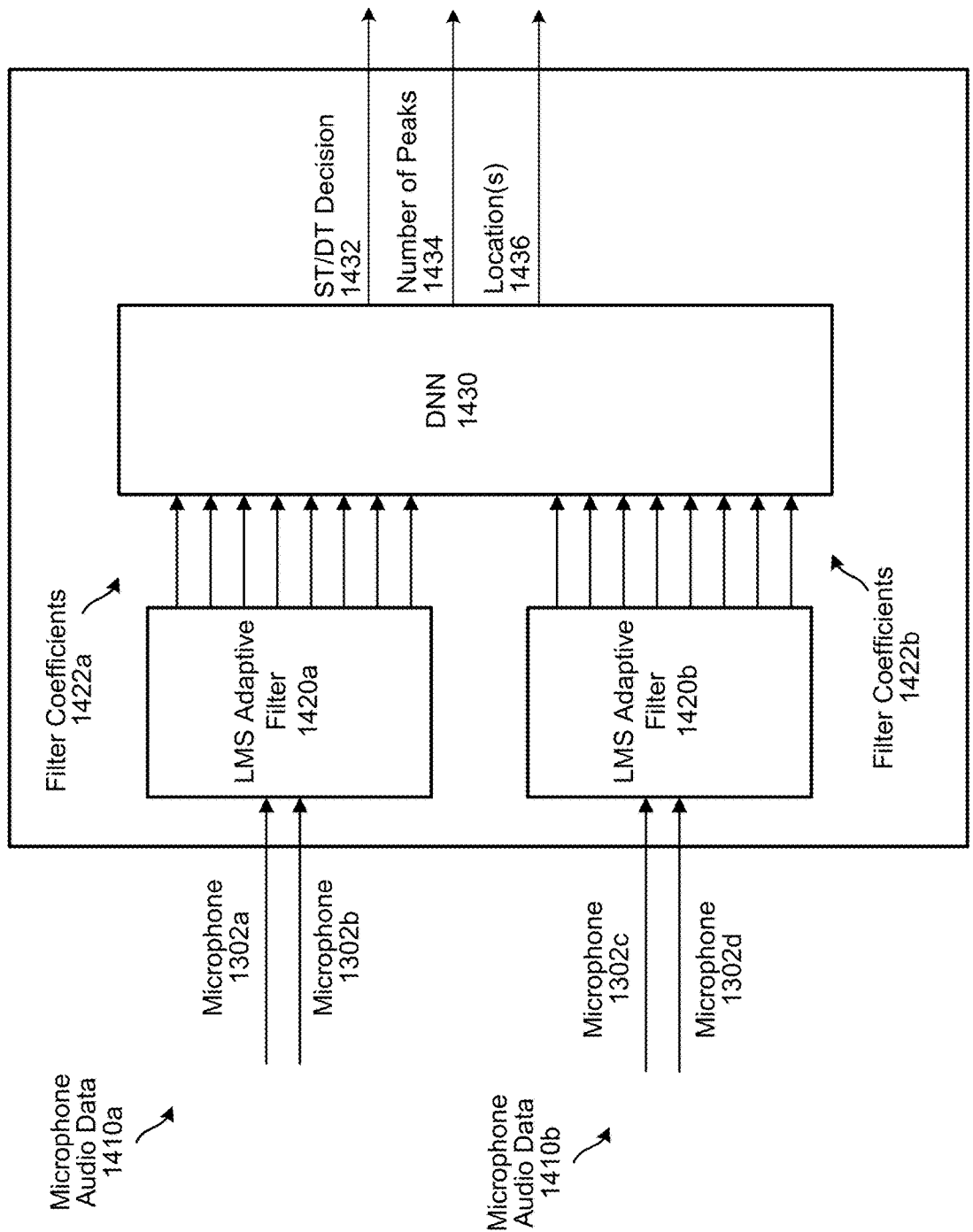
FIG. 14 illustrates an example of a component diagram to improve location estimation according to embodiments of the present disclosure.

FIG. 14 illustrates an example of a component diagram to improve location estimation according to embodiments of the present disclosure. As illustrated in FIG. 14, the device 110 may include two pairs of microphones, two LMS adaptive filters, and a single DNN or decision logic to interpret the results. For example, first microphone audio data 1410a may correspond to the first microphone pair 1320 (e.g., first microphone 1302a and second microphone 1302b), whereas second microphone audio data 1410b may correspond to the second microphone pair 1330.

As illustrated in FIG. 14, the first microphone audio data 1410a may be input to a first LMS adaptive filter 1420a, which may generate first filter coefficients 1422a. Similarly, the second microphone audio data 1410b may be input to a second LMS adaptive filter 1420b, which may generate second filter coefficients 1422b.

A DNN component 1430 may receive the first filter coefficients 1422a and the second filter coefficients 1422b and may generate single-talk/double-talk (ST/DT) decision 1432, a number of peaks 1434, and/or location(s) 1436 associated with the peaks using the techniques described above. For example, the first filter coefficients 1422a may identify location(s) of audio source(s) between 0 and 180 degrees, the second filter coefficients 1422b may identify location(s) of audio source(s) between 90 and 270 degrees, and the DNN 1430 may interpret these results to determine location(s) of audio source(s) between 0 and 360 degrees. While FIG. 14 illustrates the DNN 1430 generating the output data (ST/DT decision 1432, number of peaks 1434, and/or location(s) 1436), the disclosure is not limited thereto and the device 110 may generate the output data using any techniques known to one of skill in the art, including without using a DNN, without departing from the disclosure. Additionally or alternatively, while FIG. 14 illustrates the device 110 including two pairs of microphones and two LMS adaptive filters 1420, the disclosure is not limited thereto and the device 110 may include three or more pairs of microphones and/or LMS adaptive filters without departing from the disclosure.

FIG. 15 is a block diagram conceptually illustrating example components of a system according to embodiments of the present disclosure. In operation, the system 100 may include computer-readable and computer-executable instructions that reside on the device 110, as will be discussed further below.

The device 110 may include one or more audio capture device(s), such as a microphone array which may include one or more microphones 112. The audio capture device(s) may be integrated into a single device or may be separate. The device 110 may also include an audio output device for producing sound, such as loudspeaker(s) 116. The audio output device may be integrated into a single device or may be separate.

As illustrated in FIG. 15, the device 110 may include an address/data bus 1524 for conveying data among components of the device 110. Each component within the device 110 may also be directly connected to other components in addition to (or instead of) being connected to other components across the bus 1524.

The device 110 may include one or more controllers/processors 1504, which may each include a central processing unit (CPU) for processing data and computer-readable instructions, and a memory 1506 for storing data and instructions. The memory 1506 may include volatile random access memory (RAM), non-volatile read only memory (ROM), non-volatile magnetoresistive (MRAM) and/or other types of memory. The device 110 may also include a data storage component 1508, for storing data and controller/processor-executable instructions (e.g., instructions to perform operations discussed herein). The data storage component 1508 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1502.

The device 110 includes input/output device interfaces 1502. A variety of components may be connected through the input/output device interfaces 1502. For example, the device 110 may include one or more microphone(s) 112 (e.g., a plurality of microphone(s) 112 in a microphone array), one or more loudspeaker(s) 114, and/or a media source such as a digital media player (not illustrated) that connect through the input/output device interfaces 1502, although the disclosure is not limited thereto. Instead, the number of microphone(s) 112 and/or the number of loudspeaker(s) 114 may vary without departing from the disclosure. In some examples, the microphone(s) 112 and/or loudspeaker(s) 114 may be external to the device 110, although the disclosure is not limited thereto. The input/output interfaces 1502 may include A/D converters (not illustrated) and/or D/A converters (not illustrated).

The input/output device interfaces 1502 may also include an interface for an external peripheral device connection such as universal serial bus (USB), FireWire, Thunderbolt, Ethernet port or other connection protocol that may connect to network(s) 199.

The input/output device interfaces 1502 may be configured to operate with network(s) 199, for example via an Ethernet port, a wireless local area network (WLAN) (such as WiFi), Bluetooth, ZigBee and/or wireless networks, such as a Long Term Evolution (LTE) network, WiMAX network, 3G network, etc. The network(s) 199 may include a local or private network or may include a wide network such as the internet. Devices may be connected to the network(s) 199 through either wired or wireless connections.

The device 110 may include components that may comprise processor-executable instructions stored in storage 1508 to be executed by controller(s)/processor(s) 1504 (e.g., software, firmware, hardware, or some combination thereof). For example, components of the device 110 may be part of a software application running in the foreground and/or background on the device 110. Some or all of the controllers/components of the device 110 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Computer instructions for operating the device 110 and its various components may be executed by the controller(s)/processor(s) 1504, using the memory 1506 as temporary "working" storage at runtime. The computer instructions may be stored in a non-transitory manner in non-volatile memory 1506, storage 1508, or an external device. Alternatively, some or all of the executable instructions may be embedded in hardware or firmware in addition to or instead of software.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the fixed beamformer, acoustic echo canceller (AEC), adaptive noise canceller (ANC) unit, residual echo suppression (RES), double-talk detector, etc. may be implemented by a digital signal processor (DSP).

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first audio data representing first audio captured by a first microphone of a first device;
   receiving second audio data representing second audio captured by a second microphone of the first device;
   generating, using an adaptive filter of the first device, third audio data by subtracting the second audio data from the first audio data;
   determining a plurality of filter coefficient values of the adaptive filter;
   determining a first value in the plurality of filter coefficient values, the first value being a highest value in the plurality of filter coefficient values;
   determining that the first value satisfies a first condition;
   determining a second value in the plurality of filter coefficient values, the second value being a second highest value in the plurality of filter coefficient values;
   determining that the second value satisfies the first condition;
   determining that the first audio data represents near-end speech and far-end speech; and
   setting, based on the first value and the second value satisfying the first condition and the first audio data representing near-end speech and far-end speech, first parameters associated with generating output audio data.

2. The computer-implemented method of claim 1, further comprising:
   receiving fourth audio data from a second device;
   sending the fourth audio data to a loudspeaker of the first device;
   determining, based on at least the first audio data and the second audio data, a plurality of audio signals comprising:
      a first audio signal corresponding to a first direction, and
      a second audio signal corresponding to a second direction; and
   generating, by the first device using the first parameters, fifth audio data by subtracting the second audio signal from the first audio signal.

3. The computer-implemented method of claim 1, further comprising:
   determining that a portion of the first audio data includes a representation of at least one of the near-end speech or the far-end speech; and
   updating the plurality of filter coefficient values.

4. The computer-implemented method of claim 1, further comprising:
   determining a first filter coefficient of the adaptive filter that corresponds to the first value;
   determining a first direction associated with the first filter coefficient;
   associating the first direction with a first audio source;
   determining a second filter coefficient of the adaptive filter that corresponds to the second value;
   determining a second direction associated with the second filter coefficient; and
   associating the second direction with a second audio source.

5. The computer-implemented method of claim 1, further comprising:
   determining, prior to receiving the first audio data, a second plurality of filter coefficient values of the adaptive filter associated with a first time range;
   determining a third value in the second plurality of filter coefficient values, the third value being a highest value in the second plurality of filter coefficient values;
   determining that only the third value satisfies the first condition;
   determining that only the far-end speech is present during the first time range; and
   setting second parameters associated with generating the output audio data.

6. The computer-implemented method of claim 5, further comprising:
   determining, using a first filter coefficient of the adaptive filter associated with the third value, that the third value corresponds to a first direction;
   associating the first direction with the far-end speech;
   determining that the first value corresponds to the first filter coefficient; and
   associating the first value with the far-end speech.

7. The computer-implemented method of claim 5, further comprising:
   determining, using a first filter coefficient of the adaptive filter associated with the third value, that the third value corresponds to a first direction;
   associating the first direction with the far-end speech;
   determining, using a second filter coefficient of the adaptive filter associated with the second value, that the second value corresponds to a second direction different than the first direction; and
   associating the second direction with the near-end speech.

8. The computer-implemented method of claim 1, wherein the first parameters are associated with at least one of:
   selecting first settings for a second adaptive filter of the first device, the first settings configured to improve sound quality associated with the near-end speech;
   disabling dynamic reference beam selection for the second adaptive filter;
   disabling filter coefficient adaptation of the second adaptive filter; or
   disabling residual echo suppression.

9. The computer-implemented method of claim 1, further comprising:
   determining, prior to receiving the first audio data, a second plurality of filter coefficient values of the adaptive filter associated with a first time range;

determining a third value in the second plurality of filter coefficient values, the third value being a highest value in the second plurality of filter coefficient values;

determining that only the third value satisfies the first condition;

determining that only the near-end speech is present during the first time range; and setting second parameters associated with generating the output audio data.

10. The computer-implemented method of claim 9, further comprising:

determining, using a first filter coefficient of the adaptive filter associated with the third value, that the third value corresponds to a first direction;

associating the first direction with the near-end speech;

determining that the first value corresponds to the first filter coefficient; and associating the first value with the near-end speech.

11. A computer-implemented method, the method comprising:

receiving first audio data representing first audio captured by a first microphone of a first device;

receiving second audio data representing second audio captured by a second microphone of the first device;

generating, using an adaptive filter of the first device, third audio data by subtracting the second audio data from the first audio data;

determining a plurality of filter coefficient values of the adaptive filter;

determining a first value in the plurality of filter coefficient values, the first value being a highest value in the plurality of filter coefficient values;

determining that the first value satisfies a first condition;

determining a second value in the plurality of filter coefficient values, the second value being a second highest value in the plurality of filter coefficient values;

determining that the second value does not satisfy the first condition;

determining that the first audio data represents far-end speech; and setting, based on the first value satisfying the first condition and the first audio data representing far-end speech, first parameters associated with generating output audio data.

12. The computer-implemented method of claim 11, further comprising:

receiving fourth audio data from a second device;

sending the fourth audio data to a loudspeaker of the first device;

determining, based on at least the first audio data and the second audio data, a plurality of audio signals comprising:

a first audio signal corresponding to a first direction, and a second audio signal corresponding to a second direction; and generating, by the first device using the first parameters, fifth audio data by subtracting the second audio signal from the first audio signal.

13. The computer-implemented method of claim 11, further comprising:

determining that a portion of the first audio data includes a representation of at least one of the far-end speech or near-end speech; and updating the plurality of filter coefficient values.

14. The computer-implemented method of claim 11, further comprising:

determining a first filter coefficient of the adaptive filter that corresponds to the first value;

determining a first direction associated with the first filter coefficient; and associating the first direction with the far-end speech.

15. The computer-implemented method of claim 11, further comprising:

determining, after setting the first parameters, a second plurality of filter coefficient values of the adaptive filter associated with a first time range;

determining a third value in the second plurality of filter coefficient values, the third value being a highest value in the second plurality of filter coefficient values;

determining that the third value satisfies the first condition;

determining a fourth value in the second plurality of filter coefficient values, the fourth value being a second highest value in the second plurality of filter coefficient values;

determining that the fourth value satisfies the first condition;

determining that the far-end speech and near-end speech are both present during the first time range; and setting second parameters associated with generating the output audio data.

16. The computer-implemented method of claim 15, further comprising:

determining, using a first filter coefficient of the adaptive filter associated with the first value, that the first value corresponds to a first direction;

associating the first direction with the far-end speech;

determining that the third value corresponds to the first filter coefficient;

associating the third value with the far-end speech;

determining, using a second filter coefficient of the adaptive filter associated with the fourth value, that the fourth value corresponds to a second direction different than the first direction; and associating the second direction with near-end speech.

17. The computer-implemented method of claim 11, wherein the first parameters are associated with at least one of:

selecting first settings for a second adaptive filter of the first device, the first settings configured to improve sound quality associated with near-end speech;

disabling dynamic reference beam selection for the second adaptive filter;

disabling filter coefficient adaptation of the second adaptive filter; or disabling residual echo suppression.

18. The computer-implemented method of claim 11, further comprising:

determining, based on at least the first audio data and the second audio data, a plurality of audio signals comprising:

a first audio signal corresponding to a first direction, and a second audio signal corresponding to a second direction;

determining, using a first filter coefficient of the adaptive filter associated with the first value, that the first value corresponds to the first direction;

associating the first direction with the far-end speech;
determining that the second direction is associated with near-end speech; and
generating, by the first device using the first parameters, fourth audio data by subtracting the first audio signal from the second audio signal.

19. The computer-implemented method of claim 11, further comprising:
    determining, prior to receiving the first audio data, a second plurality of filter coefficient values of the adaptive filter associated with a first time range;
    determining a third value in the second plurality of filter coefficient values, the third value being a highest value in the second plurality of filter coefficient values;
    determining that the third value satisfies the first condition;
    determining a fourth value in the second plurality of filter coefficient values, the fourth value being a second highest value in the second plurality of filter coefficient values;
    determining that the fourth value satisfies the first condition;
    determining that only near-end speech is present during the first time range;
    determining, using a first filter coefficient of the adaptive filter associated with the third value, that the third value corresponds to a first direction;
    associating the first direction with a first user profile;
    determining, using a second filter coefficient of the adaptive filter associated with the fourth value, that the fourth value corresponds to a second direction; and
    associating the second direction with a second user profile.

20. A system comprising:
    at least one processor; and
    memory including instructions operable to be executed by the at least one processor to cause the system to:
        receive first audio data representing first audio captured by a first microphone of a first device;
        receive second audio data representing second audio captured by a second microphone of the first device;
        generate, using an adaptive filter of the first device, third audio data by subtracting the second audio data from the first audio data;
        determine a plurality of filter coefficient values of the adaptive filter;
        determine a first value in the plurality of filter coefficient values, the first value being a highest value in the plurality of filter coefficient values;
        determine that the first value satisfies a first condition;
        determine a second value in the plurality of filter coefficient values, the second value being a second highest value in the plurality of filter coefficient values;
        determine that the second value does not satisfy the first condition;
        determine that the first audio data does not represent far-end speech;
        in response to determining that the first audio data does not represent far-end speech, determine that the first audio data represents near-end speech; and
        set, based on the first value satisfying the first condition and the first audio data representing near-end speech first parameters associated with generating output audio data.

* * * * *